(12) United States Patent
DePoo

(10) Patent No.: US 10,548,342 B2
(45) Date of Patent: *Feb. 4, 2020

(54) RESEALABLE SPOUT FOR SELECTIVELY ACCESSING COCONUT WATER WITHIN A COCONUT

(71) Applicant: Paul DePoo, Key West, FL (US)

(72) Inventor: Paul DePoo, Key West, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,554

(22) Filed: Nov. 26, 2018

(65) Prior Publication Data

US 2019/0159506 A1    May 30, 2019

Related U.S. Application Data

(63) Continuation-in-part of application No. 15/715,874, filed on Sep. 26, 2017, now Pat. No. 10,278,415,
(Continued)

(51) Int. Cl.
*A23N 1/00* (2006.01)
*B26D 3/26* (2006.01)
(Continued)

(52) U.S. Cl.
CPC ............... *A23N 1/00* (2013.01); *A23L 2/04* (2013.01); *A23L 19/03* (2016.08); *A47J 19/00* (2013.01);
(Continued)

(58) Field of Classification Search
CPC ........ B65D 25/40; B65D 25/48; B65D 85/72; B65D 2231/022; A47J 19/00; B26D 3/26; A23N 1/00; A23L 42/04; A23L 19/03
(Continued)

(56) References Cited

U.S. PATENT DOCUMENTS

| 1,277,308 A | 8/1918 | Gunturiz |
| 1,506,571 A | 8/1924 | Deremberg |

(Continued)

FOREIGN PATENT DOCUMENTS

| AU | 2004101090 A4 | 2/2005 |
| CN | 2494604 Y | 6/2002 |

(Continued)

*Primary Examiner* — Lien M Ngo

(57) ABSTRACT

A self-contained, consumer-ready product from a coconut that has a seed-case, a layer of coconut meat inside of the seed-case, and an internal cavity containing sterile coconut water, in a condition that is ready for a consumer to access and remove the sterile water within the coconut, and a method for providing such a product. One method comprises forming an aperture that extends through the seed-case of the coconut but does not extend through the layer of coconut meat; forming a coconut pre-product in a first location, by affixing to the apertured coconut a closure member that is adapted to close the aperture and to be easily removed by a consumer in a second location different from the first location; and providing a self-contained, consumer-ready coconut product, by associating, with the coconut pre-product, a pre-selected plunger member that includes an elongated lance member that the consumer slides within the aperture after removal of the closure member in the second location and penetrates through the layer of coconut meat and into the internal cavity containing the sterile water.

11 Claims, 41 Drawing Sheets

Related U.S. Application Data which is a continuation of application No. 14/733,960, filed on Jun. 8, 2015, now Pat. No. 9,770,048, which is a continuation of application No. 13/839,516, filed on Mar. 15, 2013, now Pat. No. 9,049,885, which is a continuation of application No. PCT/US2011/047147, filed on Aug. 9, 2011, and a continuation-in-part of application No. 12/793,097, filed on Jun. 3, 2010, now Pat. No. 8,709,519, application No. 16/200,554, which is a continuation-in-part of application No. 13/968,255, filed on Aug. 15, 2013, now abandoned.

(51) Int. Cl.
| | |
|---|---|
| A47J 19/00 | (2006.01) |
| B65D 25/40 | (2006.01) |
| A23L 19/00 | (2016.01) |
| A23L 2/04 | (2006.01) |
| B65D 85/72 | (2006.01) |
| B65D 25/48 | (2006.01) |
| B26F 1/32 | (2006.01) |
| A47J 43/00 | (2006.01) |

(52) U.S. Cl.
 CPC ............... *A47J 43/00* (2013.01); *B26D 3/26* (2013.01); *B26F 1/32* (2013.01); *B65D 25/40* (2013.01); *B65D 25/48* (2013.01); *B65D 85/72* (2013.01)

(58) Field of Classification Search
 USPC ............... 222/80–83, 83.5, 87–91; 426/489; 30/113.1, 113.3, 120.1
 See application file for complete search history.

(56) References Cited

U.S. PATENT DOCUMENTS

| | | |
|---|---|---|
| 1,630,420 A | 5/1927 | Garland |
| 1,992,479 A | 2/1935 | Santiago |
| 2,062,853 A | 12/1936 | Wright |
| 2,472,354 A | 6/1949 | Waters |
| 3,840,136 A | 10/1974 | Lanfranconi et al. |
| 4,010,543 A * | 3/1977 | Nusbaum .................. B26F 1/32 30/113.1 |
| 4,602,725 A * | 7/1986 | Malpas .............. B65D 47/2018 222/541.2 |
| 4,858,760 A | 8/1989 | Di Sturco |
| 4,881,662 A | 11/1989 | Tallman |
| 4,889,044 A | 12/1989 | Rosenfield |
| 5,005,336 A * | 4/1991 | Bloom .................. B65D 13/00 206/457 |
| 5,016,389 A | 5/1991 | Odom |
| 5,038,951 A | 8/1991 | Rizzardi |
| 5,044,512 A | 9/1991 | Giancaspro et al. |
| 5,119,559 A | 6/1992 | Sanabria |
| 5,509,551 A | 4/1996 | Terrell, II |
| 5,543,097 A | 8/1996 | Fang |
| 5,884,810 A | 3/1999 | Vizcarra |
| 6,148,996 A | 11/2000 | Morini |
| 6,971,548 B2 | 12/2005 | Smith |
| 7,959,967 B2 | 6/2011 | Pattenden |
| 8,109,236 B2 | 2/2012 | Brodowski |
| 2002/0004094 A1 | 1/2002 | Rancier |
| 2004/0071846 A1 | 4/2004 | de la Mora et al. |
| 2004/0104246 A1 | 6/2004 | Kawaguchi et al. |
| 2004/0182871 A1 | 9/2004 | Whyte |
| 2004/0245286 A1 | 12/2004 | Lee |
| 2004/0256015 A1 | 12/2004 | Margetson |
| 2005/0011909 A1 | 1/2005 | Hanell |
| 2005/0269354 A1 | 12/2005 | Smith |
| 2008/0116204 A1 | 5/2008 | Ohse |
| 2009/0291172 A1* | 11/2009 | Saez .................... A23L 2/56 426/330.5 |
| 2010/0124595 A1 | 5/2010 | Pattenden |
| 2011/0036249 A1 | 2/2011 | Barrett |
| 2013/0233885 A1 | 9/2013 | Cohen |

FOREIGN PATENT DOCUMENTS

| | | |
|---|---|---|
| CN | 1389157 A | 1/2003 |
| CN | 201501627 U | 6/2010 |
| DE | 19853804 A1 | 5/2000 |
| DE | 102006041597 A1 | 3/2008 |
| FR | 2721590 A1 | 12/1995 |
| FR | 2776270 * | 3/1998 |
| FR | 2867162 A1 | 9/2005 |
| GB | 2136344 A | 9/1984 |
| GB | 2323549 A | 9/1998 |
| IN | 238538 B | 2/2010 |
| WO | 2010091570 A | 8/2010 |
| WO | WO 2016/011536 * | 1/2016 |

\* cited by examiner

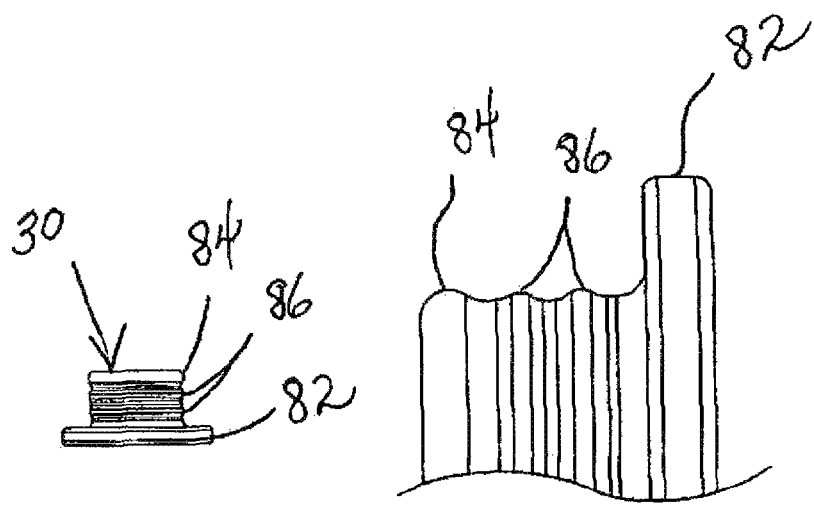
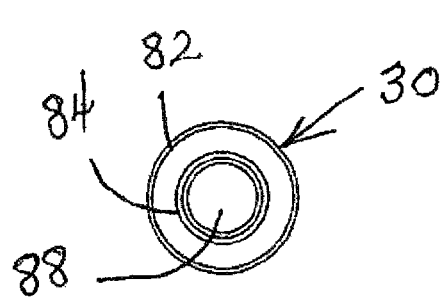
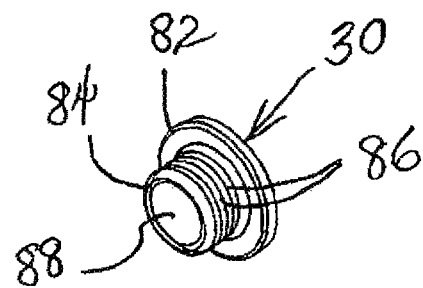
FIGS. 21A – 21D

RESEALABLE SPOUT FOR SELECTIVELY ACCESSING COCONUT WATER WITHIN A COCONUT

CROSS-REFERENCE TO RELATED APPLICATIONS

This patent application is a continuation-in-part application of co-pending application Ser. No. 15/715,874, filed Sep. 26, 2017, which is a continuation of application Ser. No. 14/733,960, filed Jun. 8, 2016, now U.S. Pat. No. 9,770,048, which is a continuation of application Ser. No. 13/839,516, filed Mar. 15, 2013, published as US2014/0044848A1, now U.S. Pat. No. 9,049,885, which is a continuation of and is related to International application no. PCT/US11/47147 filed on Aug. 9, 2011, published as WO2013/022439; application Ser. No. 13/839,516 is also a continuation-in-part of U.S. utility application Ser. No. 12/793,097 filed on Jun. 3, 2010, now U.S. Pat. No. 8,709,519; all of which are incorporated herein by reference in their entirety. This present application is also a continuation-in-part of co-pending application Ser. No. 13/968,255, filed Aug. 15, 2013, the entire content of which is also expressly incorporated by reference herein.

BACKGROUND

The present invention relates generally to spigots and, more specifically, to a spigot for a coconut that provides easy access by consumers to the sterile coconut water within a coconut. One spigot is comprised of a conduit having a spike-tip on one end and a spout on the other with a through bore therebetween. A retaining ring is also provided as a stop for the spigot. A spigot cap is placed over the spigot and covered with a protective member. Other embodiments are also described herein.

The coconut having a spigot is provided to the consumer whereby the consumer gains access to the sterile coconut water by pushing the partially inserted spigot to its seated position.
Initially the spigot is inserted through the husk and into the coconut meat having a length of un-inserted conduit extending from the exterior. The spigot remains within the coconut meat until time of use maintaining the sterile condition of the coconut water until selective consumption by the consumer.

The present invention further provides for an optional air vent and straw that optionally provides for a filter to prevent pulp from being drawn into the straw.
Further provided are the additional elements of a coconut stand and handle mountable to the coconut and a spigot having a plunger movable from a fluid blocking position within the spigot to an unblocking position so that the coconut water can be poured into a glass.

SUMMARY

A primary object of the present invention is to provide spigot access to the coconut water within a coconut.

Another object of the present invention is to provide access to coconut water within a coconut by initially inserting the spigot through the husk and into the coconut meat without piercing the coconut water cavity.

Yet another object of the present invention is to provide a spigot having a cap that is placed over the partially inserted spigot to prevent casual displacement of the spigot during shipping and handling.

Still yet another object of the present invention is to provide a spigot a protective member serving as a tamper evident seal.

An additional object of the present invention is to provide easy access by consumers to the coconut water within a coconut without compromising its sterile contents. It is thus desirable to provide a spigot for a coconut that will allow a consumer to easily extract the sterile coconut water within a coconut. It is further desirable to use the coconut as opposed to re-packaging the coconut water since the coconut is biodegradable and the coconut water remains sterile while contained within the nut.

A further object of the present invention is to provide a spigot that will provide access to the coconut water within a coconut by a consumer pressing the spigot through the remainder of the coconut meat and into the coconut water cavity.

A yet further object of the present invention is to provide an optional air vent having a resealable aperture.

A still further object of the present invention is to provide a straw that may have a filter on one end to prevent pulp from being drawn in.

Another object of the present invention is to provide a stand for a coconut.

Yet another object of the present invention is to provide a handle attachable to a coconut.

Still yet another object of the present invention is to provide a spigot having a plunger that is movable from a blocking position to an unblocking position so that the coconut water can be poured into a glass.

Yet another object of the present invention is to provide a coconut spigot comprising a grommet fixedly attached over the coconut's soft eye with a lancing spigot positioned within the soft eye until sufficient pressure is applied to the plunger to breech the seed-cavity cavity enabling the retrieval of the sterile coconut water through spigot or straw inserted into seed-case cavity through spigot conduit.

A further object of the present invention is to provide a spigot having a grommet with a flange portion and a collar portion having a plurality of ring-like ridges that engage the wall of a coconut tooled cavity forming a compression fitting for the spigot.

A still yet further object of the present invention is to provide a spigot having a flanged sleeve with transverse bored collars on opposing sides with one sleeve collar having a terminus ridge inserted into the grommet bore until mating the grommet flange with the sleeve flange wherethen the terminus ridge forms seat for the grommet.

Another object of the present invention is to provide a spigot having a plunger movably positionable within the sleeve bore whereby manual pressure applied to the plunger will breech the coconut seed-core cavity.

Still yet another object of the present invention is to provide access means for a consumer to easily retrieve sterile coconut water from a coconut's seed core cavity.

An additional object of the present invention is to provide a coconut having a spigot as means for accessing the coconut's water so that the consumer can easily retrieve the coconut water from a coconut while in its sterile state.

A further object of the present invention is to provide a coconut with a spigot partially inserted into a coconut that requires only manual pressure applied to the plunger to breech the coconut's seed-case cavity when it is desired to retrieve the coconut water in its sterile state from said coconut seed-case cavity.

A yet further object of the present invention is to provide access to coconut water within a coconut by initially inserting the spigot through the shell without piercing the meat or coconut water cavity.

Yet another object of the present invention is to provide easy access by consumers to the coconut water within a coconut without compromising its sterile contents.

Still yet another object of the present invention is to provide a spigot that will provide access to the coconut water within a coconut by a consumer pressing the plunger spigot through the remainder of the coconut meat and into the coconut water cavity The foregoing and related objects are achieved by the present invention, which provides a resealable spout for selectively accessing coconut water within a coconut having a spigot for a coconut that allows easy access by consumers to the sterile coconut water within a coconut. The spigot is comprised of a conduit having a lance on one end and a flange on the other having a through bore therebetween. A retaining ring is provided as a stop for the spigot. A spigot cap is placed over the spigot and covered with a protective member. The coconut having a spigot is provided to the consumer whereby the consumer gains easy access to the sterile coconut water by pushing the partially inserted spigot to its seated position.

More particularly, the spigot of the present invention is preferably comprised of a valve seat positioned within a coconut aperture and a plunger sleeve positioned within the valve seat. The plunger sleeve has a based positioned membrane that seals the coconut aperture. A plunger-stopper is tethered to the plunger sleeve for shipping and storage and is used by the consumer to pierce the plunger sleeve membrane to gain access to the coconut water. The plunger sleeve is also used to reseal the coconut aperture to preserve any remaining coconut water for future consumption.

Further provided is an additional, preferred embodiment for a spigot comprising a conduit having a spike-tip on one end and a spout on the other with a through bore there between. The coconut having a partially inserted spigot is provided to the consumer whereby the consumer gains access to the sterile coconut water by pushing the partially inserted spigot to its seated position with a grommet provided as an insertion stop for the spigot. An optional air vent is provided to aid in fluid flow from the spigot.

Also provided are several embodiments of both a product and method for producing same, in which a specially-configured plunger is packaged with a coconut that has been provided with an aperture penetrating the coconut shell but not passing through the layer of coconut meat, whereby the sterility of the coconut water is preserved during shipping and handling, so that a consumer can easily retrieve the sterile coconut water by simply inserting the pre-provided plunger member to penetrate through the layer of coconut meat. Preferably, there is a grommet surrounding the aperture to facilitate insertion of the plunger, and optionally there may be provided a closeable/openable cap or plug for closing the aperture during shipping/handling and/or after using the plunger to penetrate through the layer of coconut meat.

According to one preferred embodiment, there is provided a self-contained, consumer-ready product from a coconut that has a seed-case, a layer of coconut meat inside of the seed-case, and an internal cavity containing sterile coconut water, in a condition that is ready for a consumer to access and remove the sterile water within the coconut, and a method for providing such a product. The method comprises (a) forming an aperture that extends through the seed-case of the coconut but does not extend through the layer of coconut meat, thereby maintaining the sterility of the coconut water; (b) forming a coconut pre-product in a first location, by affixing to the apertured coconut a closure member that is adapted to close the aperture and to be easily removed by a consumer, in a second location different from the first location, without using any tool, where the closure member likewise does not extend through the layer of coconut meat, thereby maintaining the sterility of the coconut water; and (c) providing a self-contained, consumer-ready coconut product, by associating, with the coconut pre-product of paragraph (b), a pre-selected plunger member that includes an elongated lance member that is (1) configured to slide within the aperture after the consumer has removed the closure member in the second location and (2) has a length that is sufficient to penetrate through the layer of coconut meat and into the internal cavity containing the sterile water, when inserted through the aperture and pushed in the direction of the coconut center by the consumer.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the present invention.

BRIEF DESCRIPTION OF THE DRAWING FIGURES

In the drawings, wherein similar reference numerals and symbols denote similar features throughout the several views.

FIG. 21A through 21D shown is an illustrative view of another embodiment of the spigot grommet.

FIG. 22A through 22D is an illustrative view of another embodiment of the spigot grommet.

FIG. 23A through 23I is another illustrative view of an embodiment of the spigot sleeve.

FIGS. 24A through 24D is the plunger cap of the spigot of the present invention.

FIG. 25A through 25D is an illustrative view of a coconut aperture plug.

FIG. 26A through 26D is an illustrative view of additional embodiment of the plunger.

Figure 27:
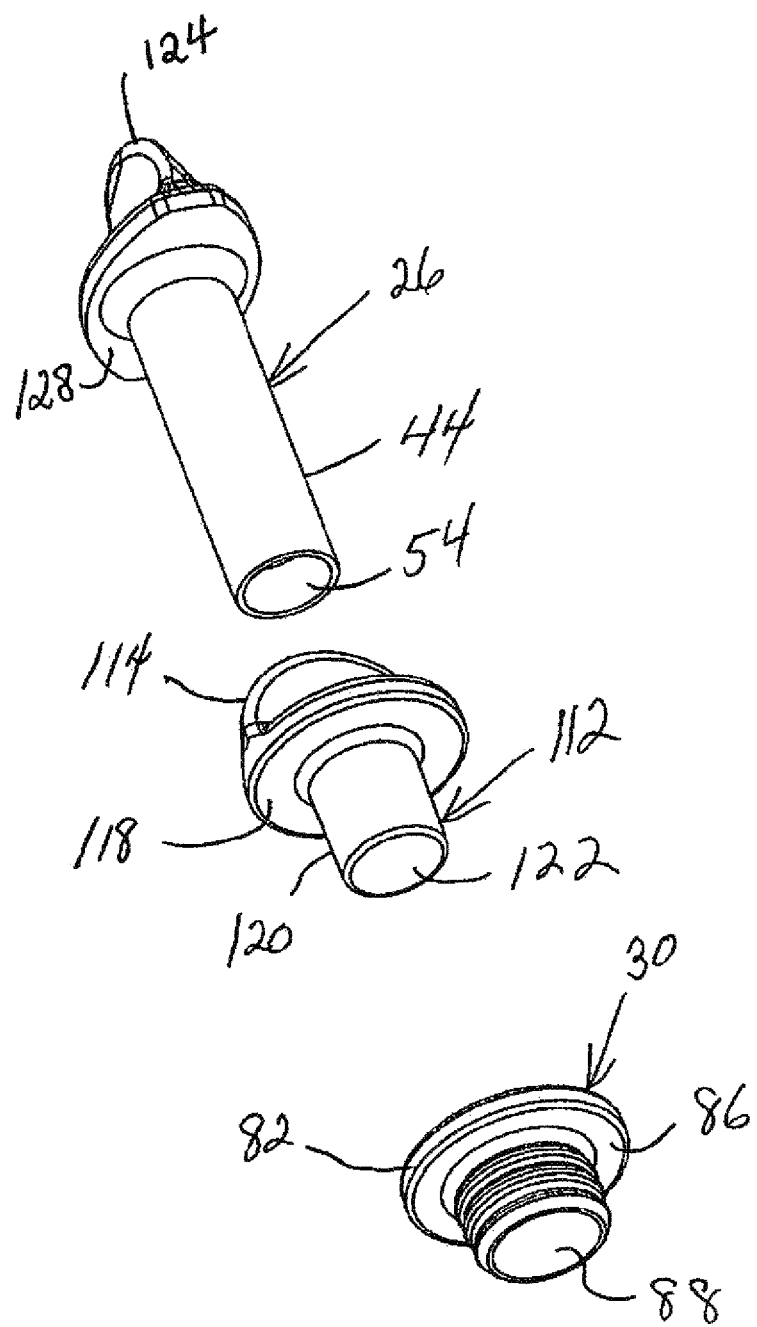
Figure 28:
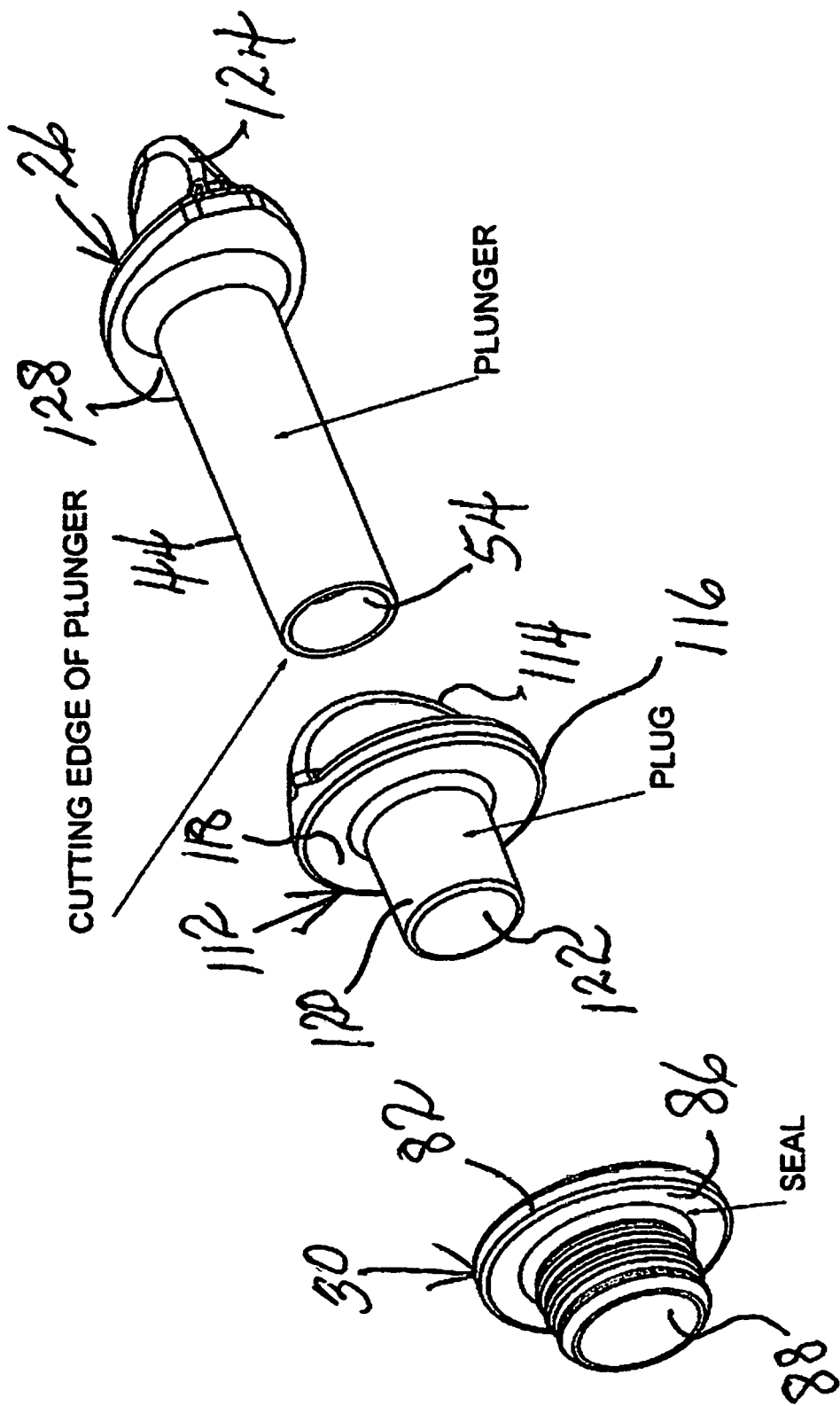

FIGS. 27 and 28, shown are exploded views of an enablement of the coconut spigot of the present invention.

Figure 29:
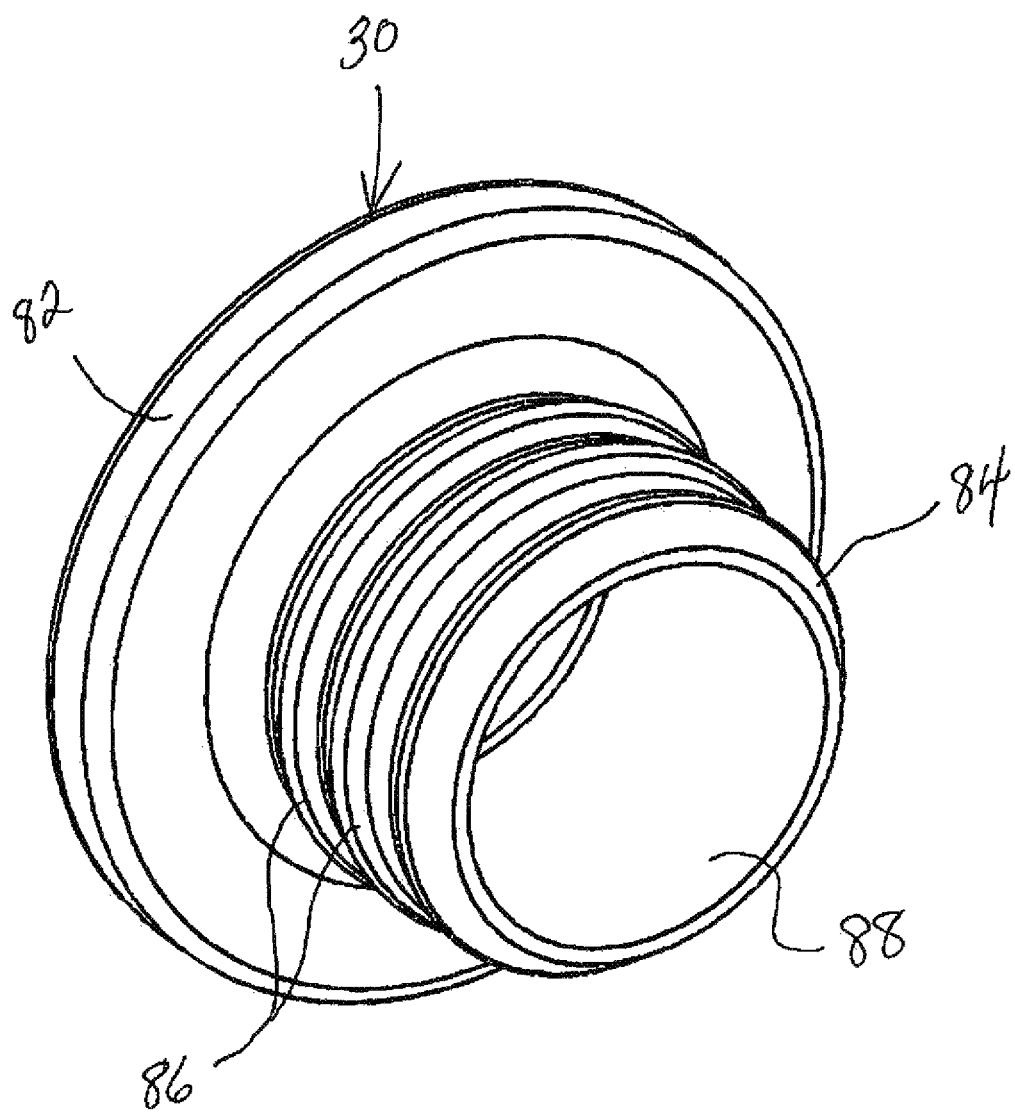

FIG. 29 is an illustrative view of an embodiment of the spigot grommet.

Figure 30:
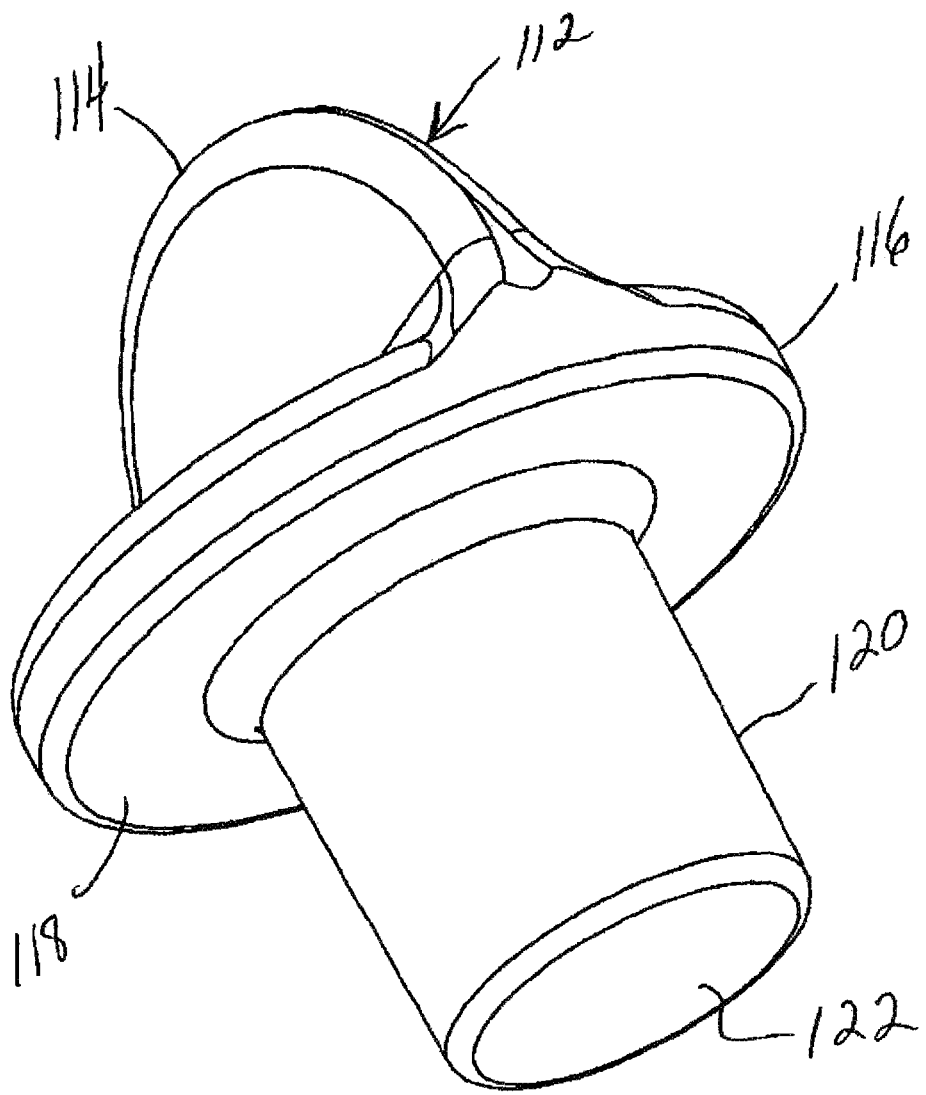

FIG. 30 is an illustrative view of a coconut aperture plug.

Figure 31:
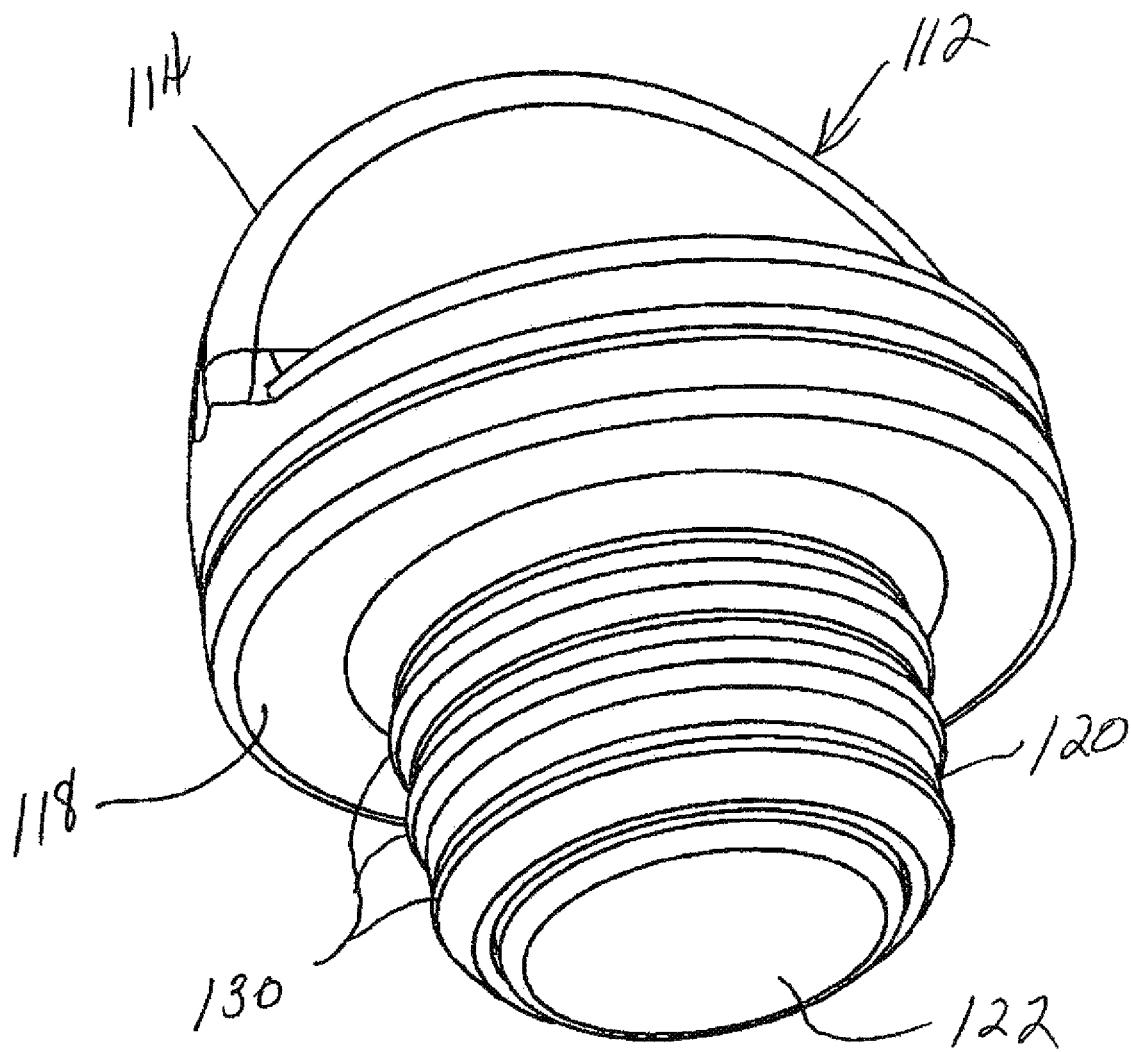

FIG. 31 is an illustrative view of another enablement of the coconut aperture plug.

Figure 32:
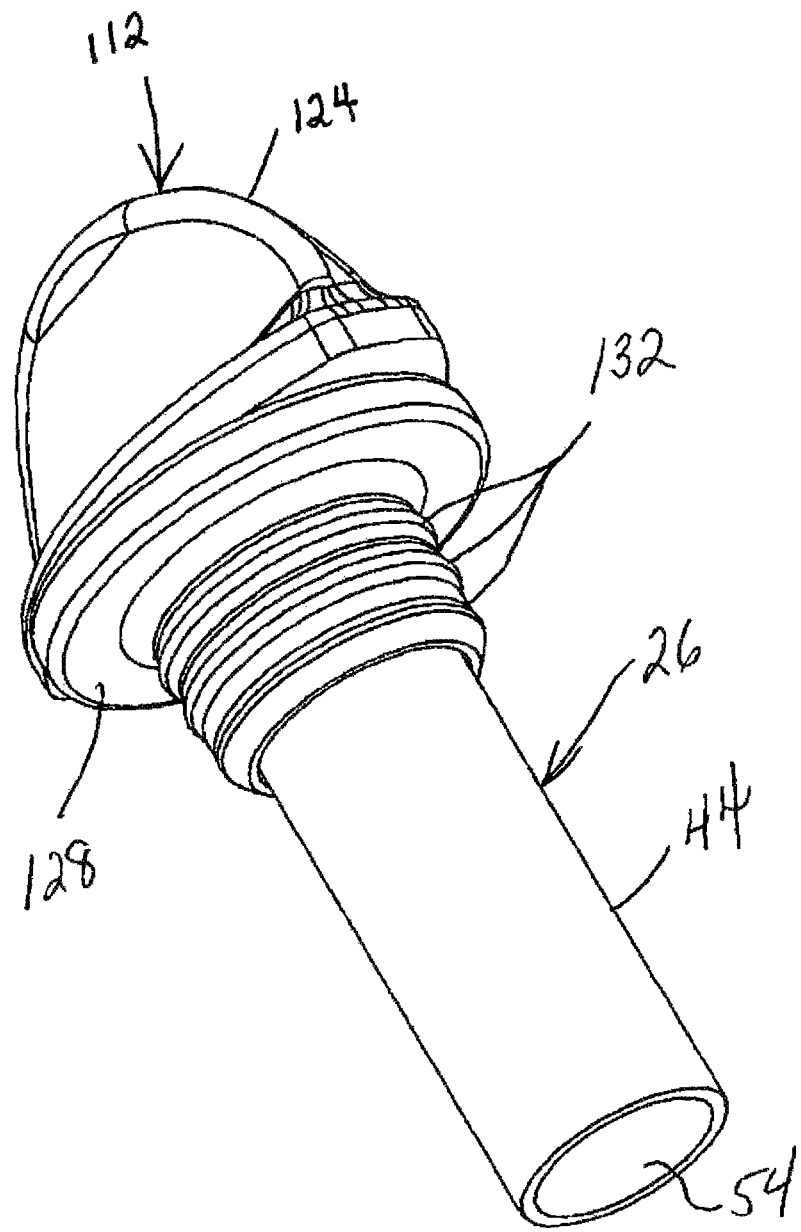

FIG. 32 is an illustrative view of a plunger seated within a grommet.

Figure 33:
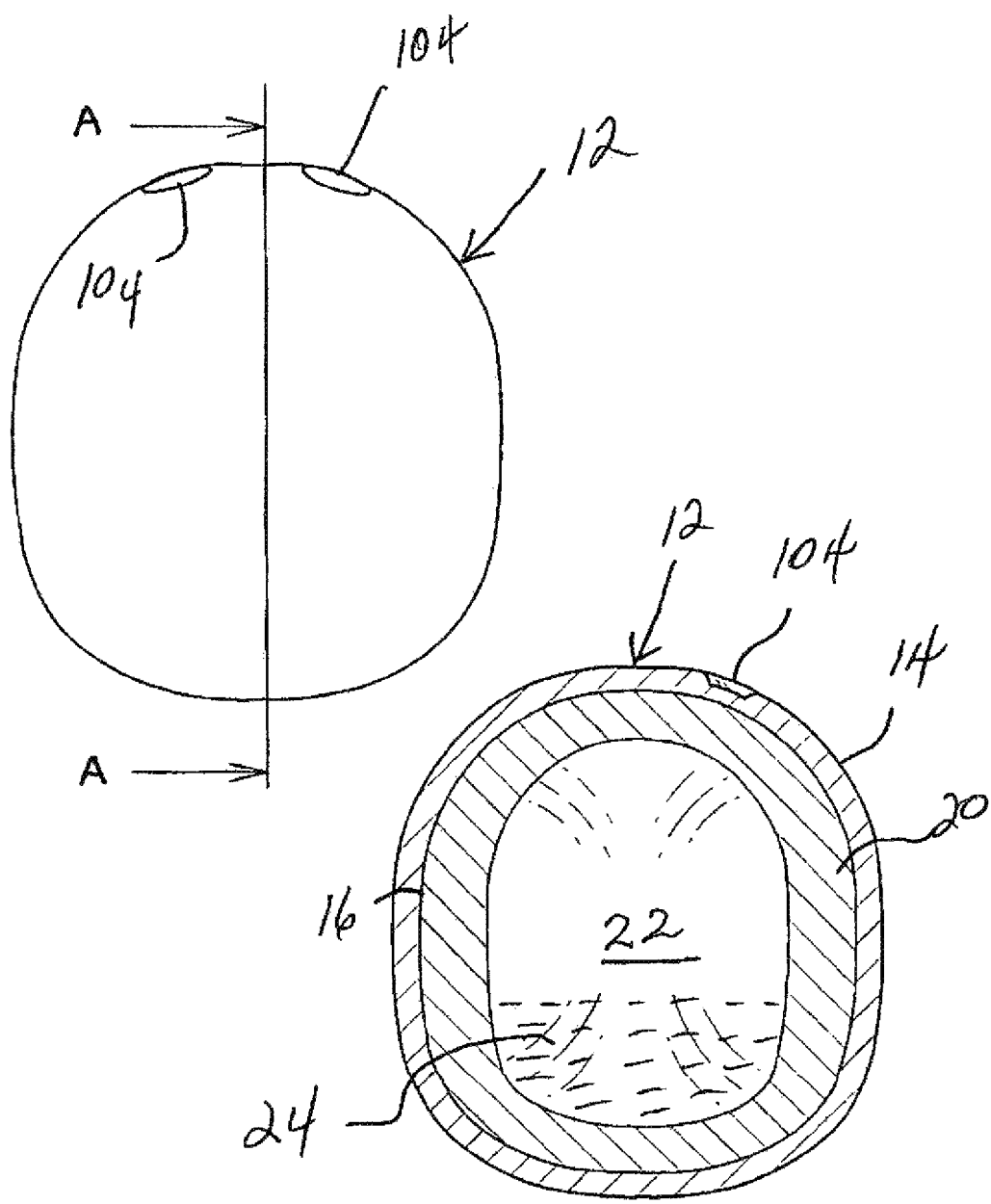

FIG. 33 is an illustrative view of a coconut.

Figure 34:
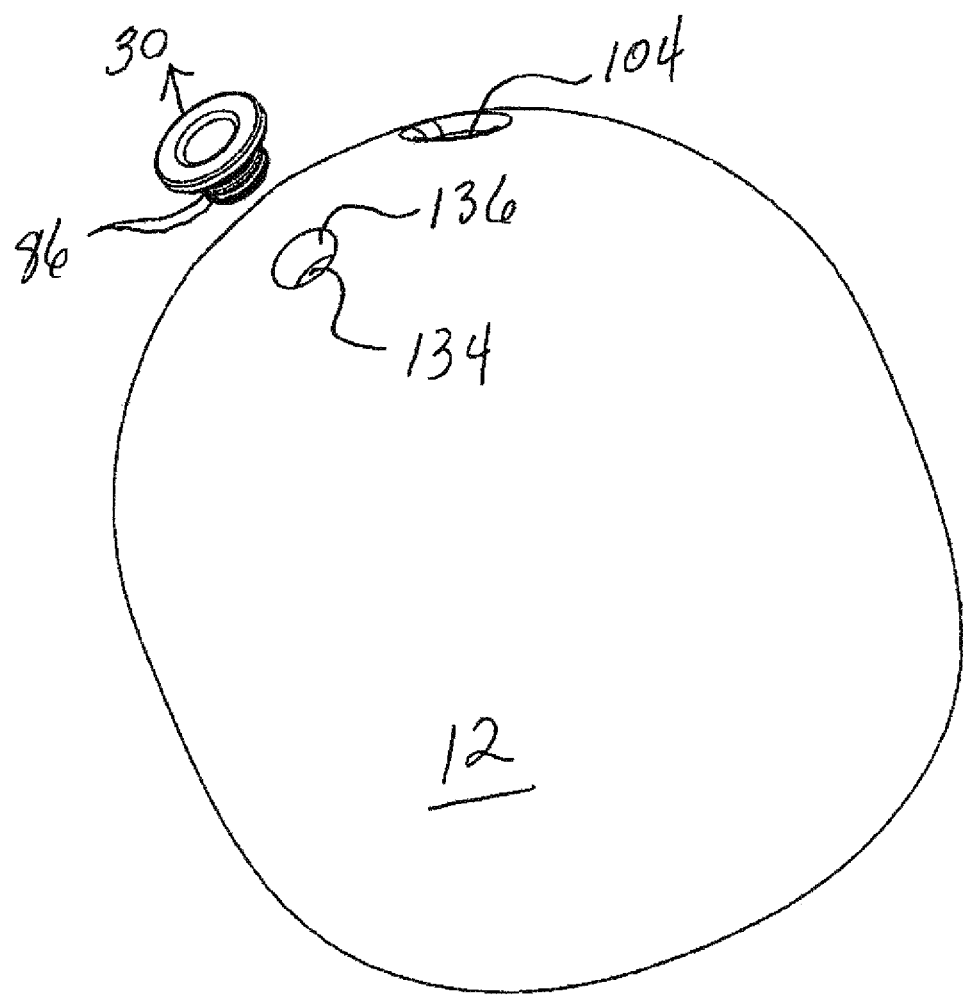

FIG. 34 is a coconut with a milled bore and grommet.

Figure 35:
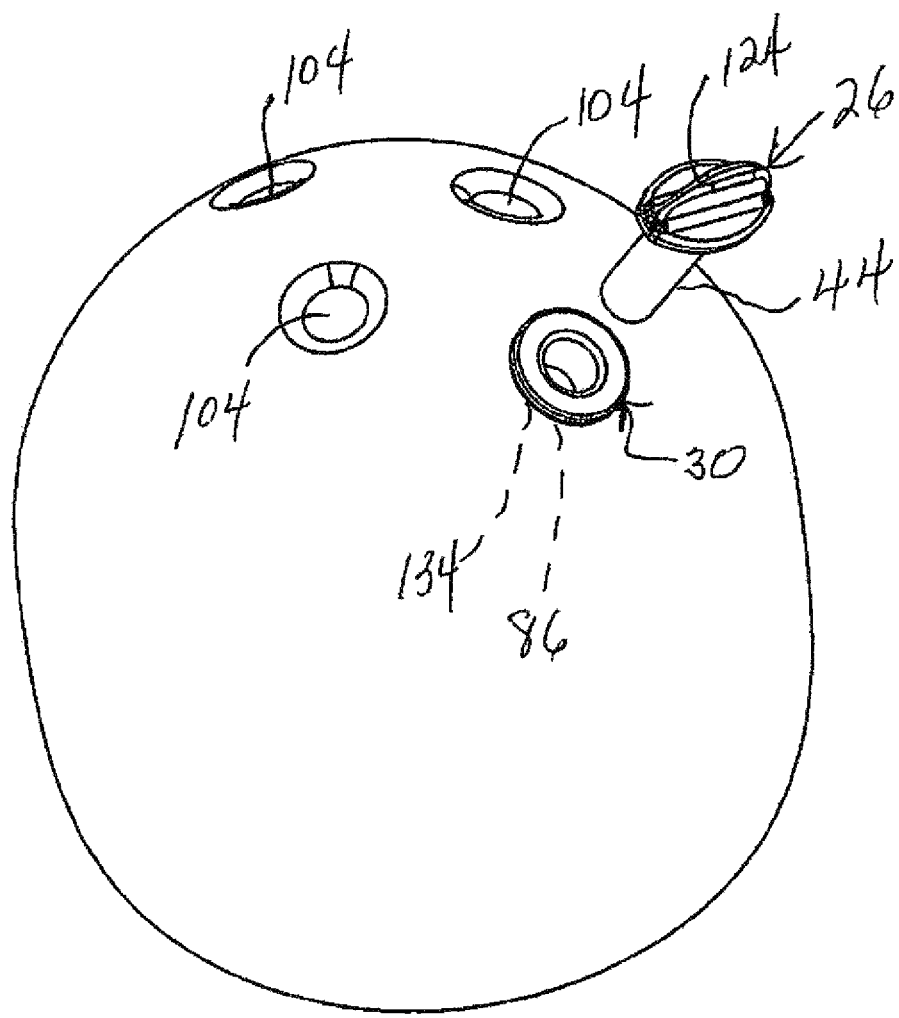

FIG. 35 is a coconut with a seated grommet.

Figure 36:
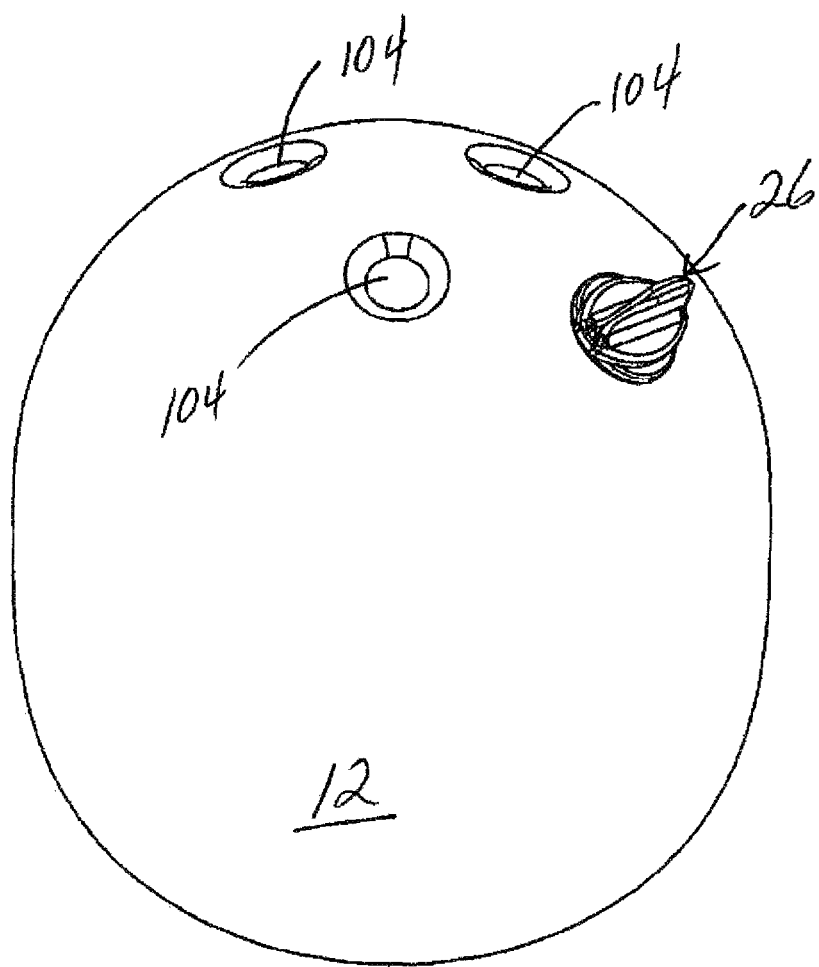
Figure 37:
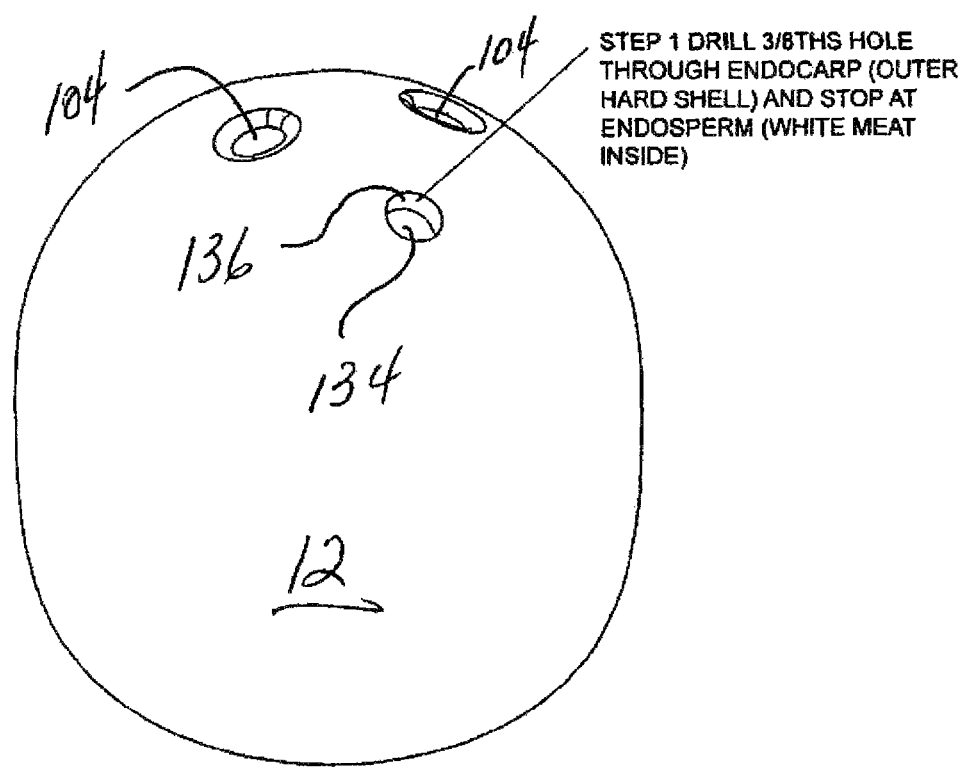
Figure 38:
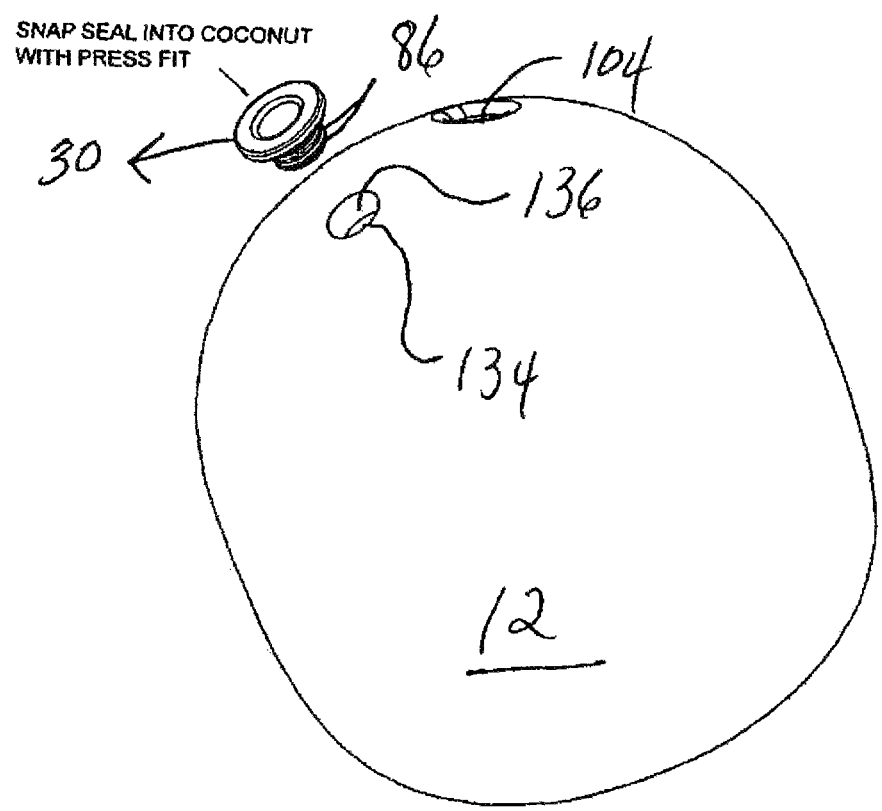
Figure 39:
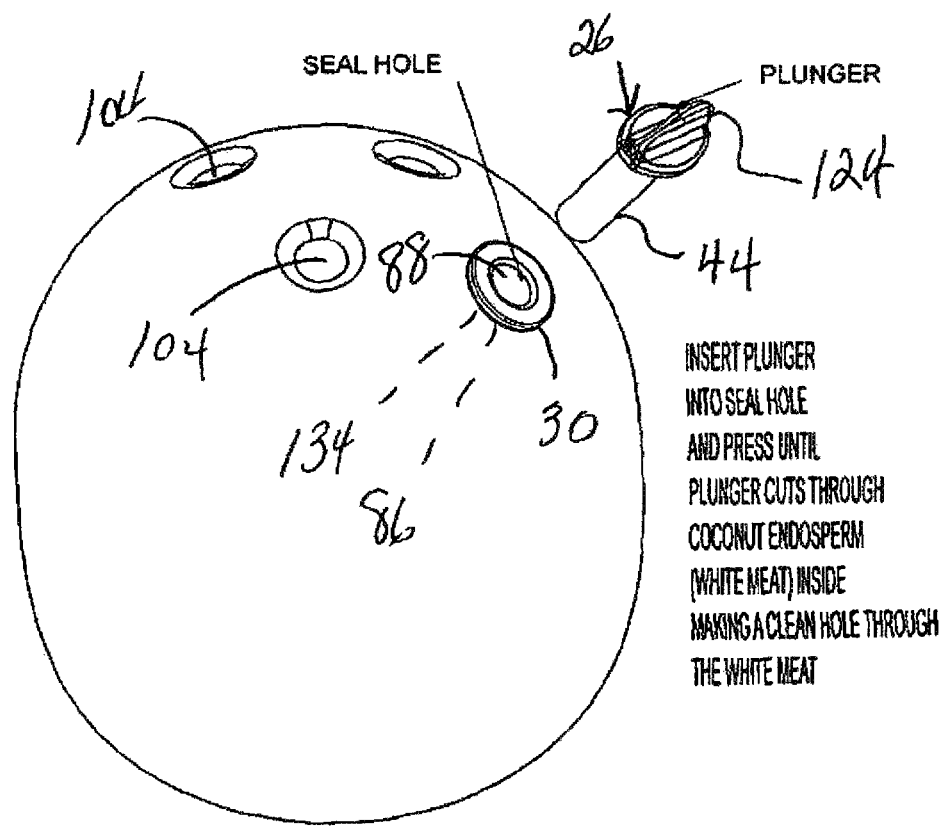
Figure 40:
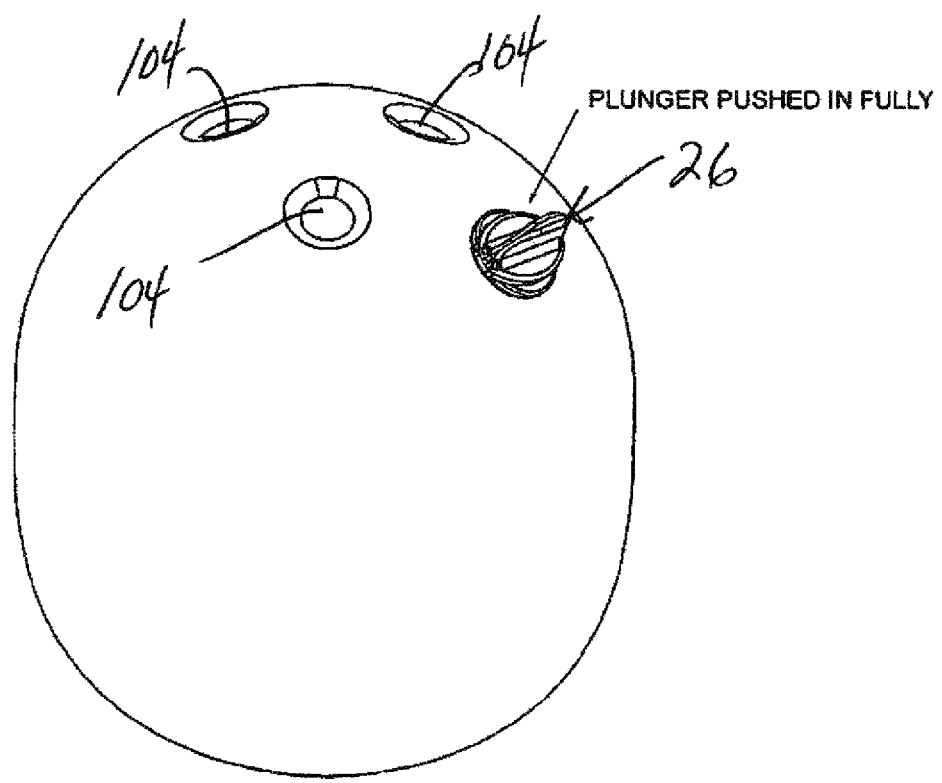
Figure 41:
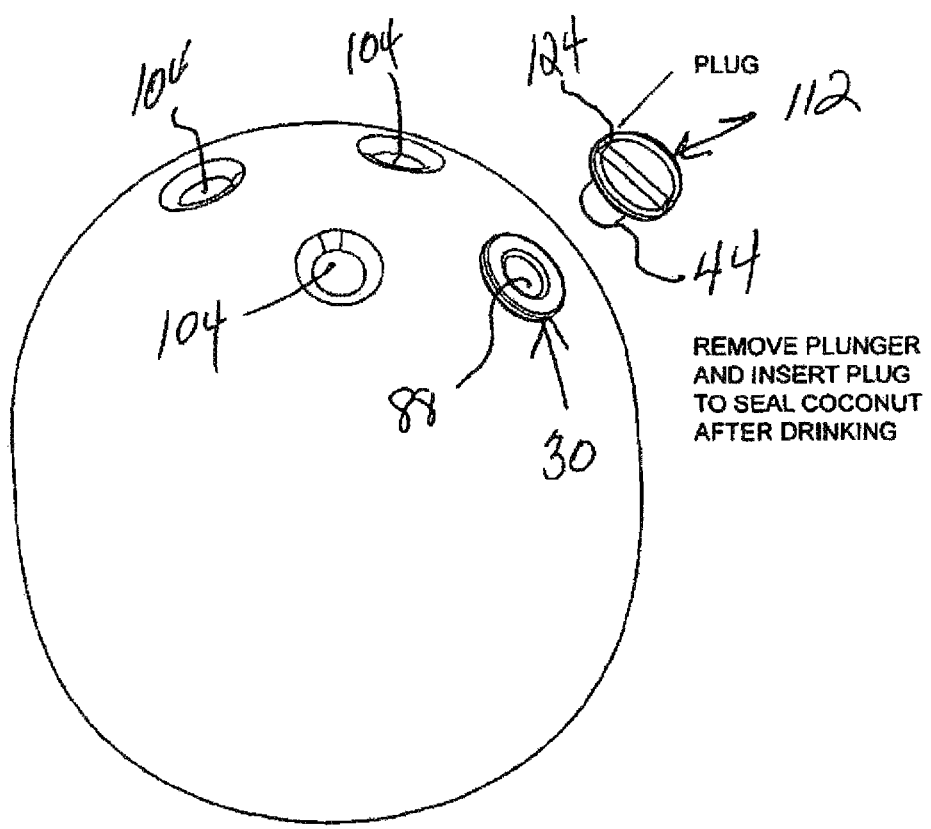

FIG. 36 is a coconut with a seated grommet and plunger.

FIGS. 37 through 41 is a progression of illustrations of the method for accessing coconut water.

DETAILED DESCRIPTION OF PREFERRED EMBODIMENTS

Figure 1:
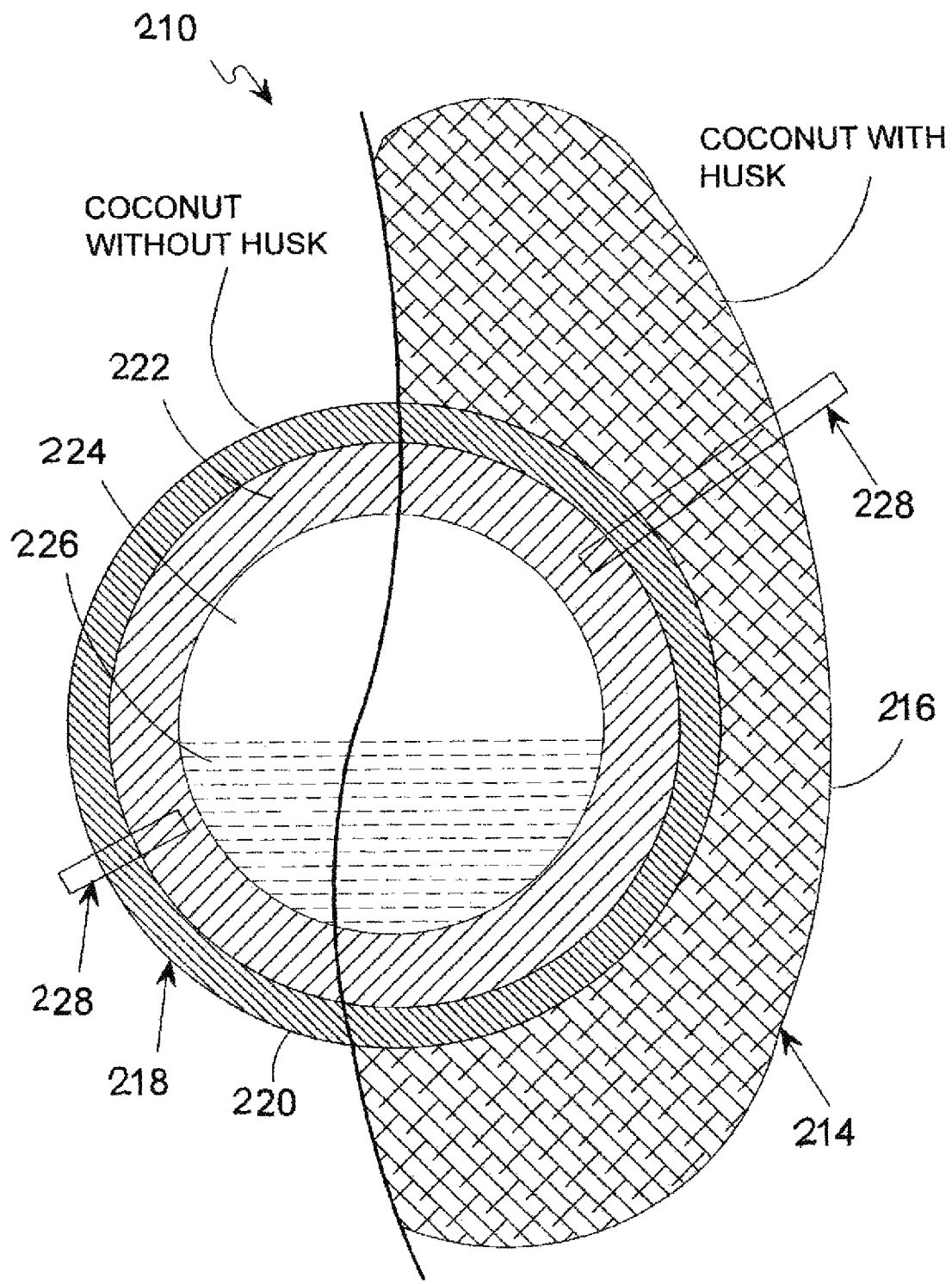
FIG. 1 is a sectional view of a coconut with and without the coconut husk providing means for accessing the coconut water when desired.

Turning now, in detail, to an analysis of the drawing figures, FIG. 1 is a sectional view of a coconut with and without the coconut husk providing means for accessing the coconut water when desired. The present invention 210 provides a spigot 228 that is partially inserted into the coconut meat 222 and then shipped to consumers who then complete inserting the spigot 228 through the coconut meat 222 into the coconut cavity 224 providing access to the sterile coconut water 226. As illustrated, the present invention provides that the spigot 228 can be used with coconuts 214 having husk 216 or with the husk removed leaving the coconut seed having coconut seed-case 220.

Figure 2:
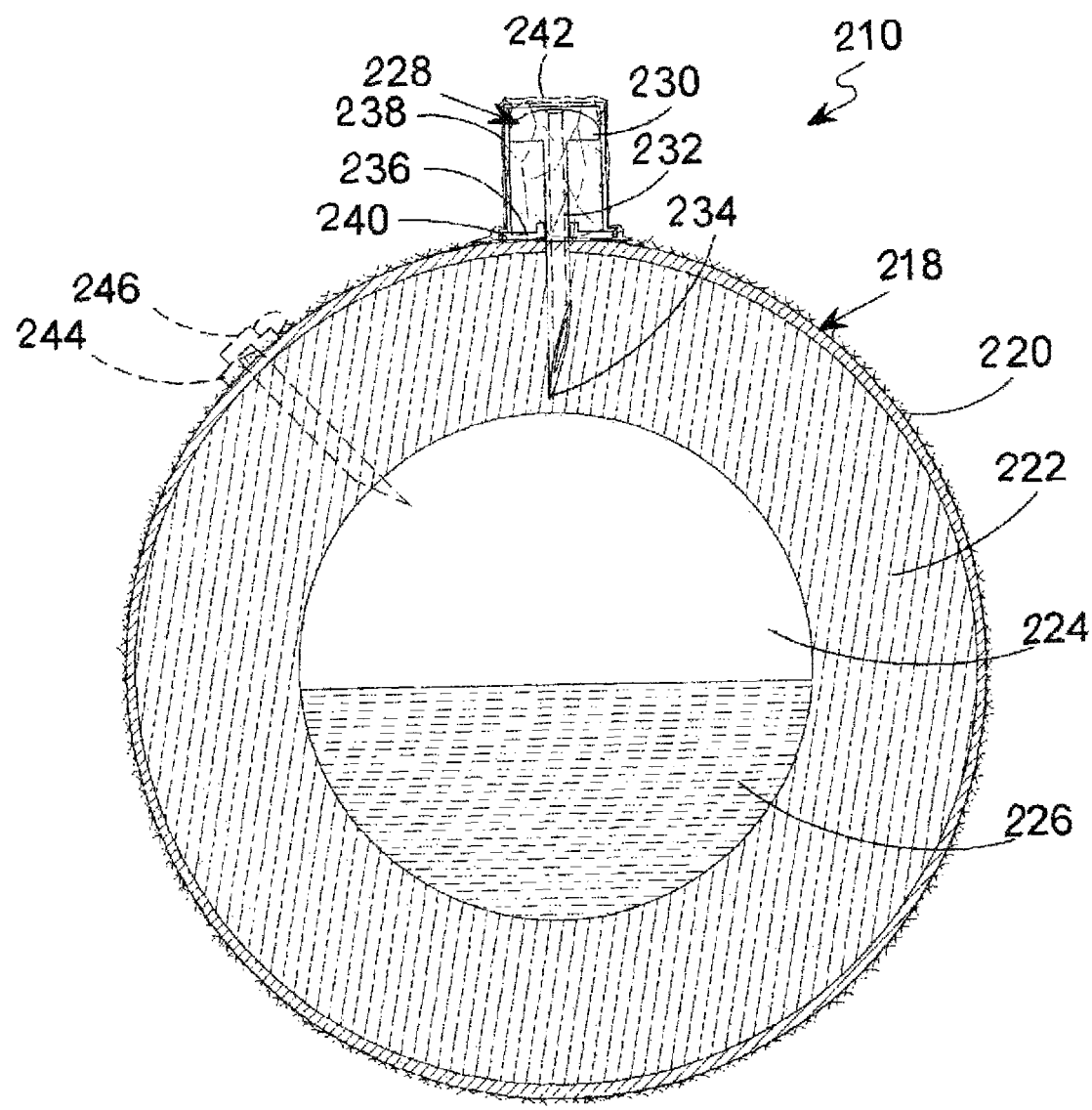
FIG. 2 is an elevational, sectional view of the coconut spigot partial inserted into a coconut.

FIG. 2 is a sectional view of the coconut spigot partially inserted into a coconut showing the present invention 210 as having means for a consumer to easily extract coconut water 226 from coconut cavity 224 by partially inserting a spigot 228 comprising spout 230, conduit 232 having spike-tip 234 through grommet 236 and coconut seed 218 having coconut seed-case 220 and into the coconut meat 222 and then covering the spigot 228 with spigot cap 238 having flange 240 frictionally engaging grommet 236 and a protective member in cap seal 242. Alternately provided is air valve 244 having tethered bung 246 for bleeding air into the coconut cavity 224 as the coconut water 226 is removed.

Figure 3:
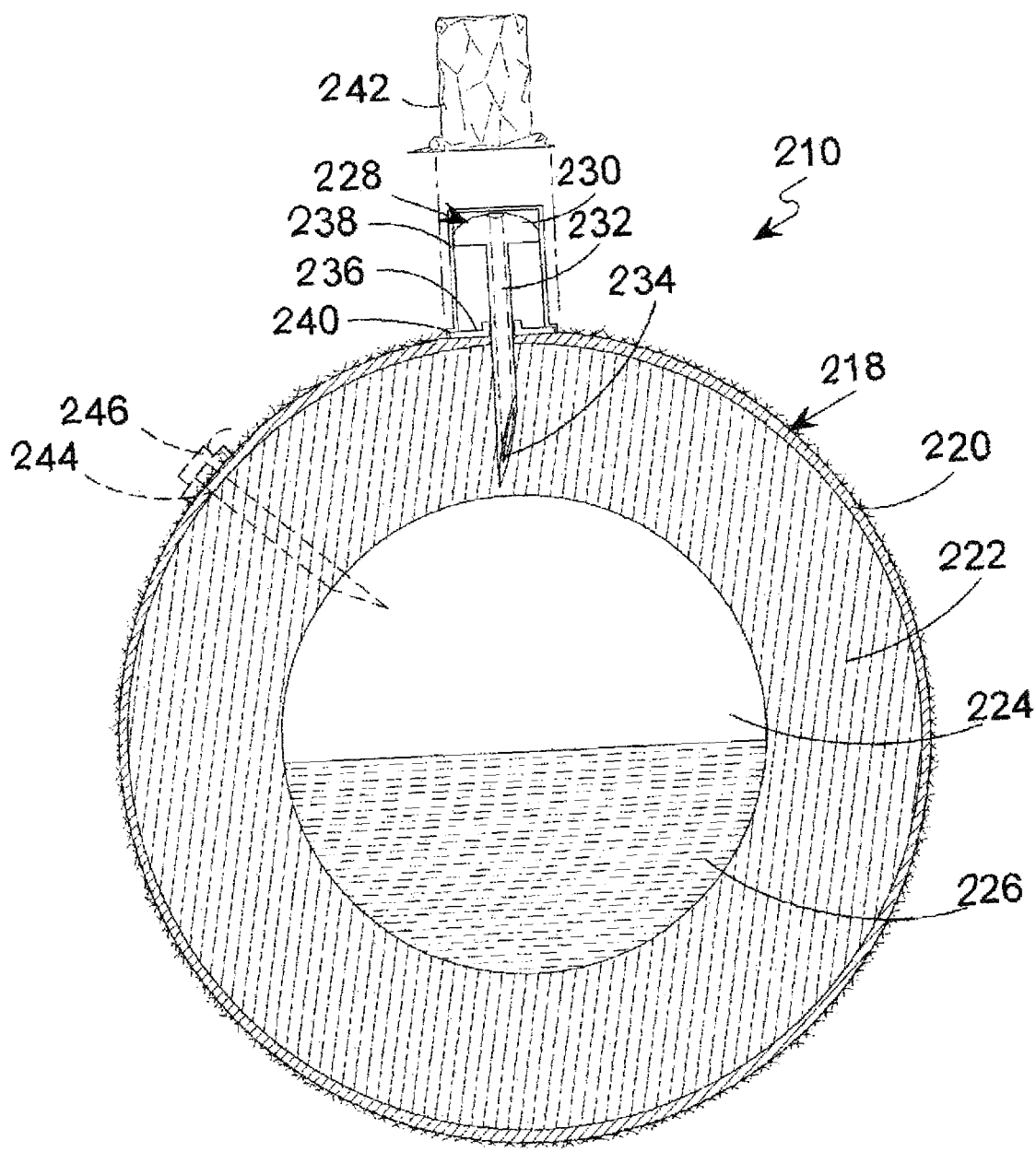
FIG. 3 is an elevational, sectional view of the coconut spigot partial inserted into a coconut.

FIG. 3 is a sectional view of the coconut spigot partially inserted into a coconut. Illustrated is the cap seal 242 removed from its seated position. Cap seal 242 serves as a tamper evident covering for the consumer and to prevent contamination of the spigot cap 238 prior to consumer access. The present invention 210 provides means for a consumer to easily extract coconut water 226 from coconut cavity 224 by partially inserting spigot 228 comprising spout 230, conduit 232 having spike-tip 234 through grommet 236 and coconut seed 218 having coconut seed-case 220 and into the coconut meat 222 and then covering the spigot 228 with spout cap 238 having flange 240 frictionally engaging grommet 236 and a protective member 242. Alternately provided is air valve 244 having tethered bung 246 for bleeding air into the coconut cavity 224 as the coconut water 226 is removed.

Figure 4:
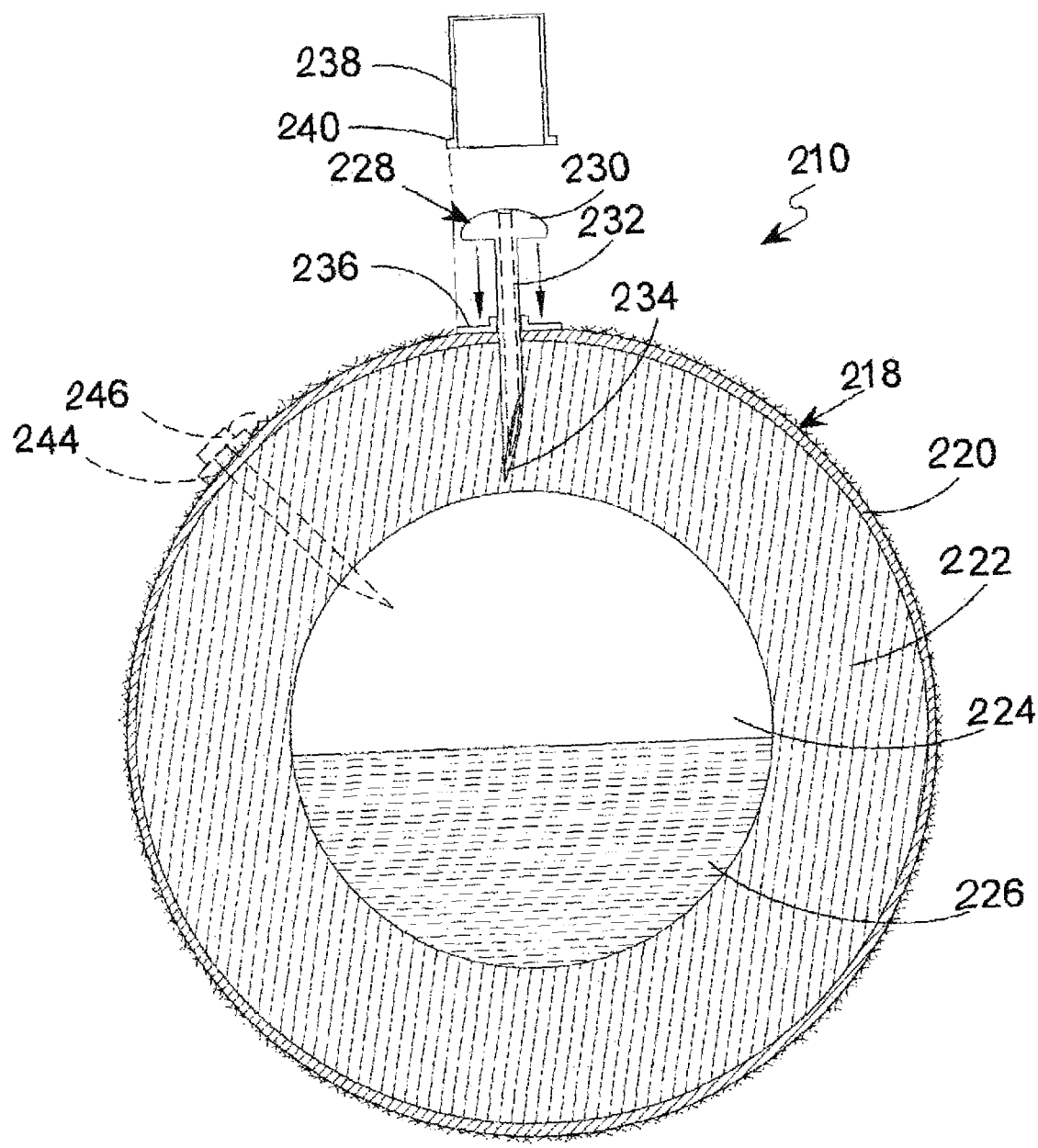
FIG. 4 is an elevational, sectional view of the coconut spigot partial inserted into a coconut with spigot cap removed.

FIG. 4 is a sectional view of the coconut spigot partial inserted into a coconut with spigot cap removed. With the cap seal removed the spigot cap 238 having flange 240 frictionally engaging grommet 236 (preventing casual displacement of spigot 228 during shipping and handling) is removed providing access to spigot 228, comprising spout 230, conduit 232 terminating in spike-tip 234 that has been is inserted through grommet 236 and positioned within coconut meat 222 of coconut seed 218 having coconut seed-case 220, where the spike-tip 234 is imbedded in coconut meat 222 without compromising the coconut cavity having the coconut water therein. The consumer can easily push spigot 228 through the remainder of coconut meat 222 into the coconut water cavity 224 thereby having access to the sterile coconut water 226. Alternately provided is air valve 244 having tethered bung 246 for bleeding air into the coconut cavity 224 as the coconut water 226 is removed.

Figure 5:
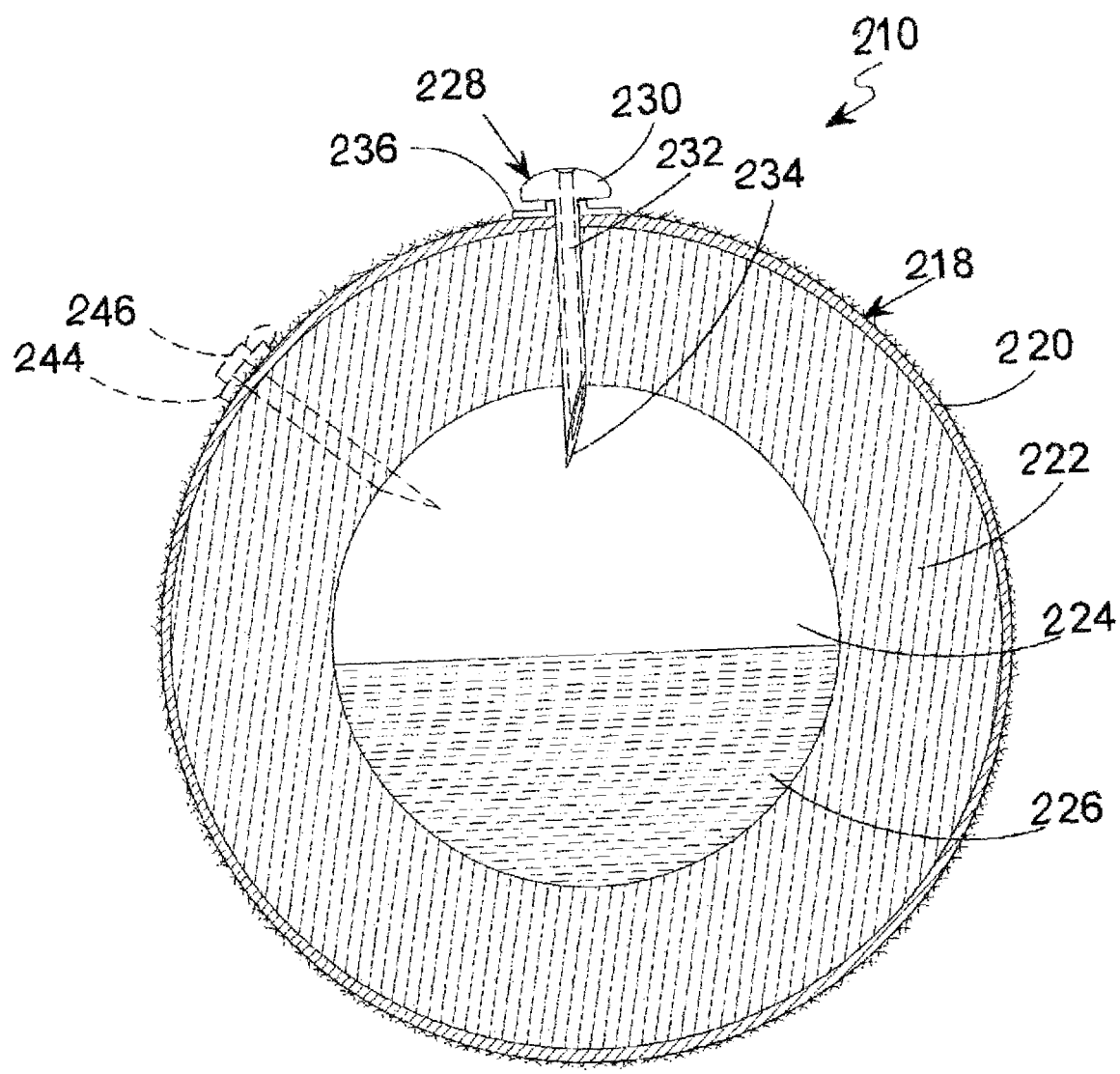
FIG. 5 is an elevational, sectional view of the coconut spigot inserted into the coconut water cavity.

FIG. 5 is a sectional view of the coconut spigot inserted into the coconut water cavity. Illustrated is spigot 228 comprising spout 230 and conduit 232 terminating in spike-tip 234 fully inserted through coconut meat 222 into the coconut cavity 224 of coconut seed 218 having coconut seed-case 220 thereby providing access to the sterile coconut water 226. Grommet 236 serves as attachment for the spigot cap and as a stop for completing the insertion of spigot 228 into coconut cavity 224.

The present invention provides for the present invention with husk 216 or without husk 216 as previously illustrated. Grommet 236 is placed on coconut husk 216 and spigot 228 is inserted through husk 216 and coconut seed 218 having seed-case 220 into coconut meat 222 so that consumer 212 can easily complete the spigot insertion into coconut cavity 224 to access coconut water 226.

Figure 6:
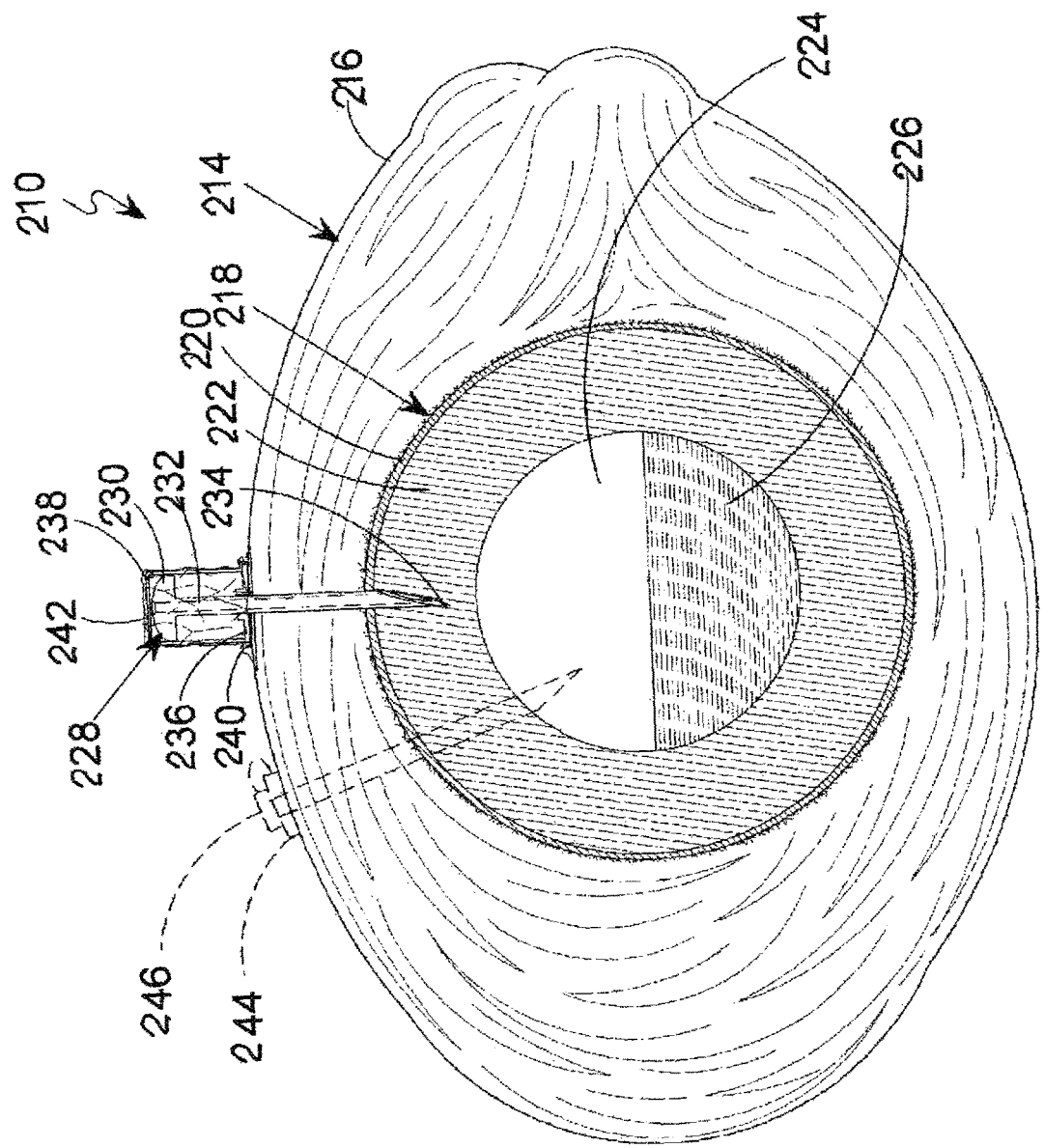
FIG. 6 is an elevational, sectional view of the coconut spigot partially inserted into a coconut.

FIG. 6 is a sectional view of the coconut spigot partially inserted into a coconut. The present invention 210 provides means for a consumer to easily extract coconut water 226 from coconut 214 having husk 216 by partially inserting a spigot 228 comprising spout 230, conduit 232 having spike-tip 234 through grommet 236, coconut husk 216 and coconut seed 218 having coconut seed-case 220 and into the coconut meat 222 and then covering the spigot 228 with spigot cap 238 having flange 240 frictionally engaging grommet 236 and a protective member in cap seal 242. Alternately provided is air valve 244 having tethered bung 246 for bleeding air into the coconut cavity 224 as the coconut water 226 is removed.

Figure 7:
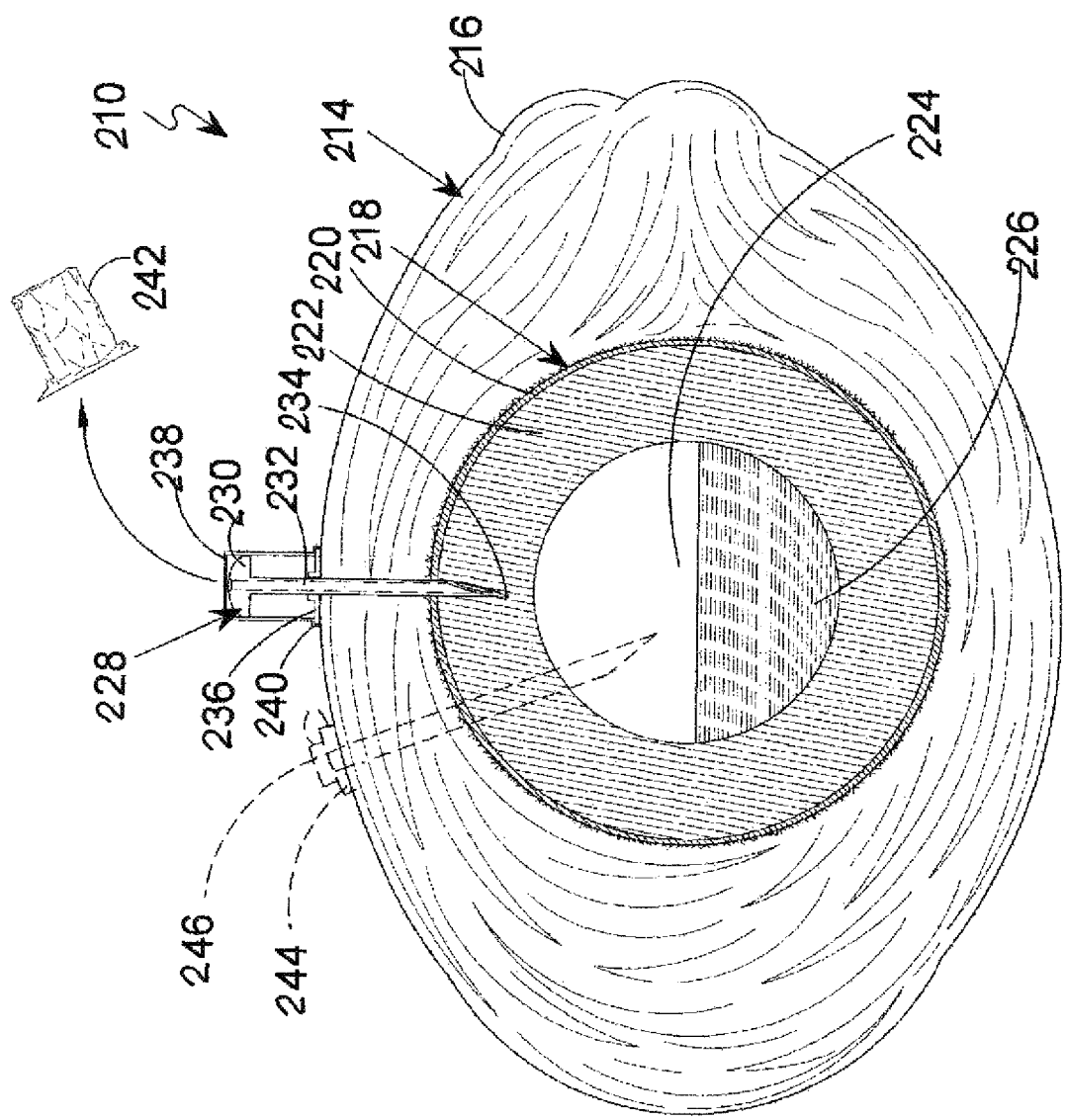
FIG. 7 is an elevational, sectional view of the coconut spigot partial inserted into a coconut.

FIG. 7 is a sectional view of the coconut spigot partial inserted into a coconut. Illustrated is the cap seal 242 removed from its seated position. Cap seal 242 serves as a tamper evident covering for the consumer and to prevent contamination of the spigot cap 238 prior to consumer access. The present invention 210 provides means for a consumer to easily extract coconut water 226 from coconut cavity 224 by partially inserting spigot 228 comprising spout 230, conduit 232 having spike-tip 234 through grommet 236 into coconut 214 having coconut husk 216 and coconut seed 218 having coconut seed-case 220 and into the coconut meat 222 and then covering the spigot 228 with spout cap 238 having flange 240 frictionally engaging grommet 236 and a protective member 242. Alternately provided is air valve 244 having tethered bung 246 for bleeding air into the coconut cavity 224 as the coconut water 226 is removed.

Figure 8:
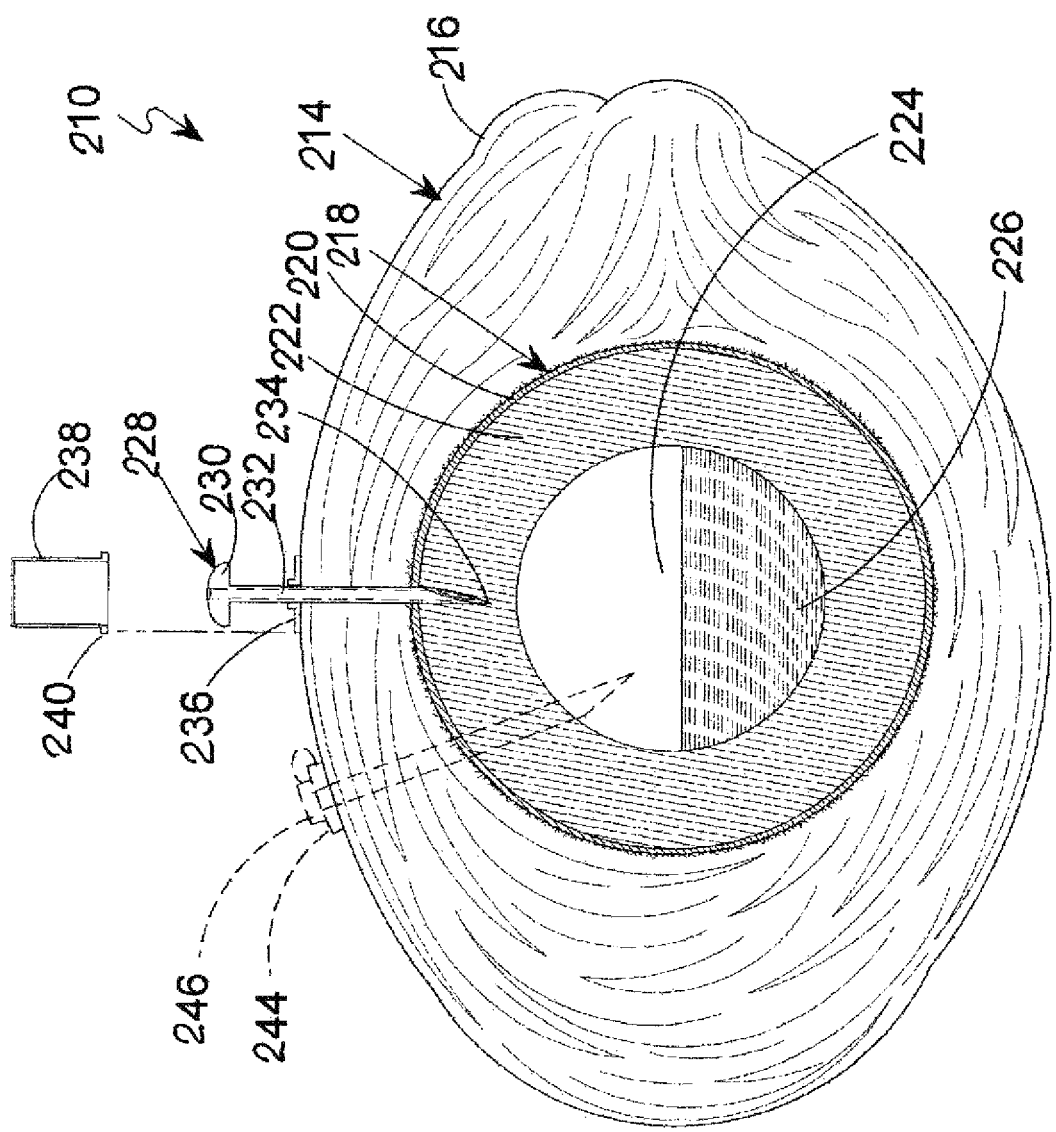
FIG. 8 is an elevational, sectional view of the coconut spigot partial inserted into a coconut with cap removed.

FIG. 8 is a sectional view of the coconut spigot partial inserted into a coconut with cap removed. With the cap seal removed the spigot cap 238 having flange 240 frictionally engaging grommet 236 is removed providing access to spigot 228, comprising spout 230, conduit 232 terminating in spike-tip 234 that has been positioned within coconut meat 222 of coconut 214 having husk 216 and coconut seed 218 having coconut seed-case 220 where then the consumer can easily push spigot 228 through the remainder of coconut meat 222 into the coconut water cavity 224 thereby having access to the sterile coconut water 226.

Figure 9:
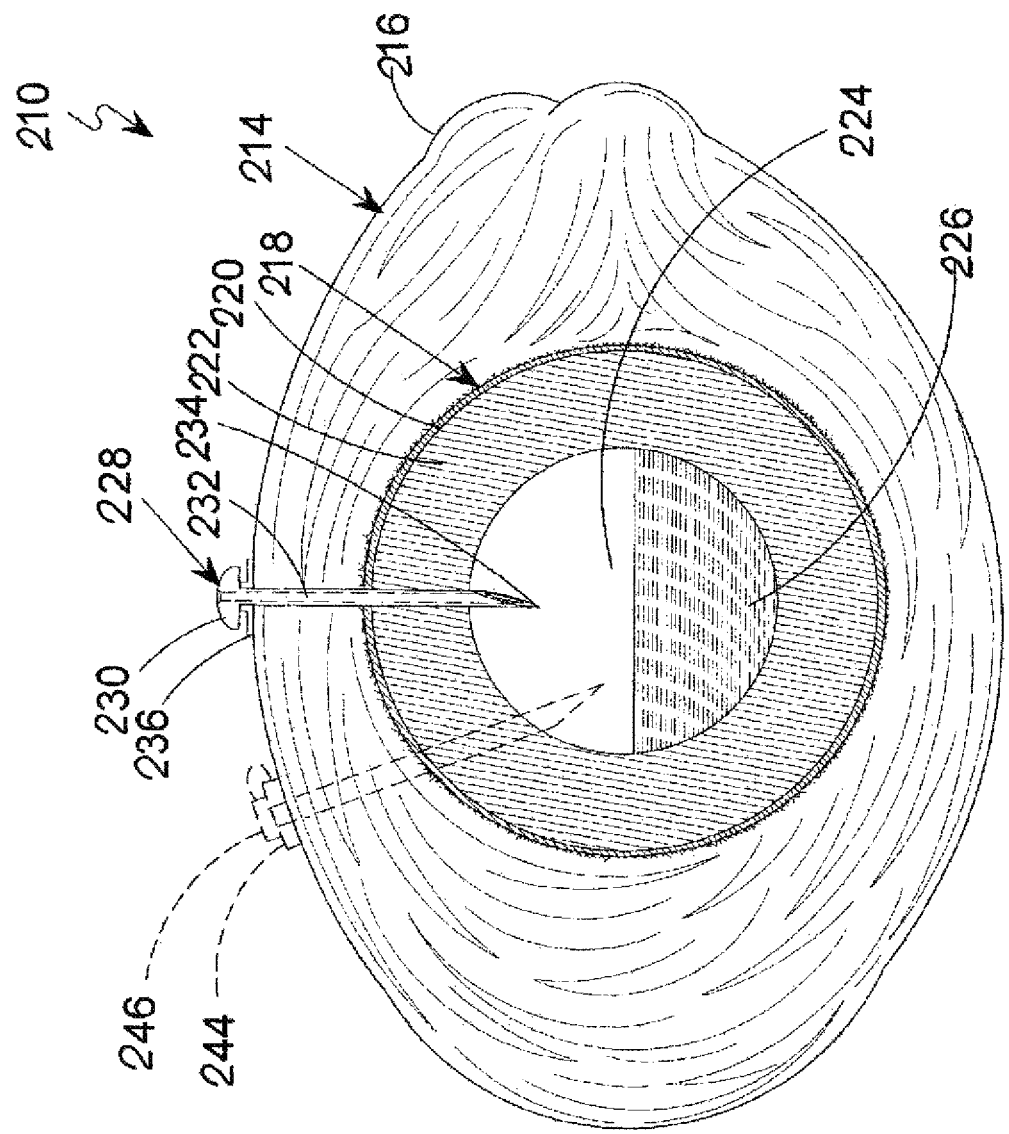
FIG. 9 is an elevational, sectional view of the coconut spigot inserted into the coconut water cavity.

FIG. 9 is a sectional view of the coconut spigot inserted into the coconut water cavity. Illustrated is spigot 228 comprising spout 230 and conduit 232 terminating in spike-tip 234 fully inserted through coconut meat 222 into the coconut cavity 224 of coconut 214 having husk 216 encompassing coconut seed 218 having coconut seed-case 220 thereby providing access to coconut water 226. Grommet 236 serves as attachment for the spigot cap and as a stop for completing the insertion of spigot 228 into coconut cavity 224.

Figure 10:
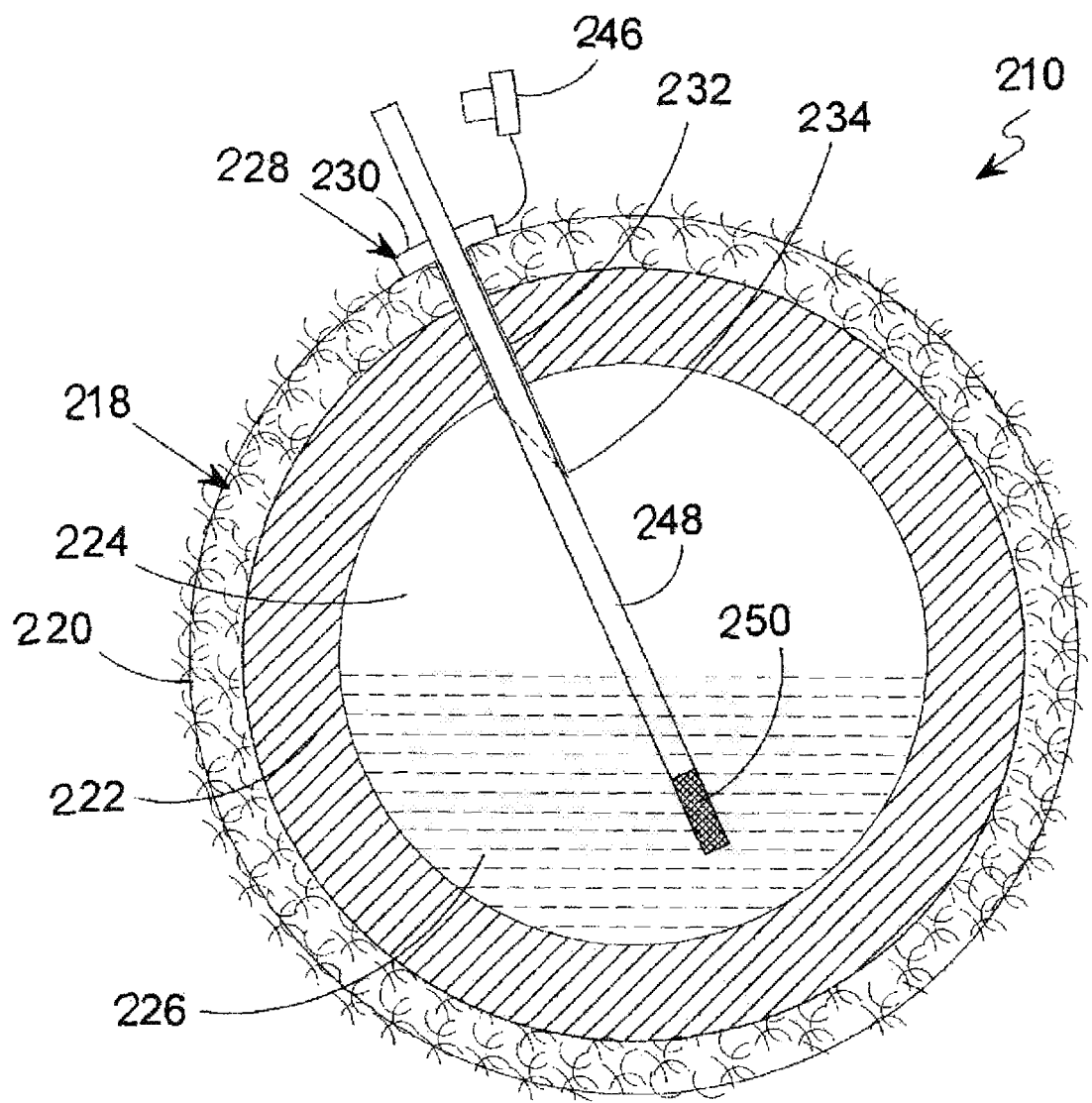
FIG. 10 is an elevational, sectional view of the coconut spigot inserted into the coconut water cavity.

FIG. 10 is a sectional view of an additional element comprising closable grommet and straw. The present invention 210 alternately provides for spigot 228 having spout 230 with closable bung 246, conduit 232 terminating in spike-tip 234 placed through grommet 236 and coconut seed 218 having coconut seed-case 220 through coconut meat 222 and into coconut cavity 224 where then the consumer can extract the coconut water through straw 248 having filter 250 to prevent pulp from being drawn into the straw.

Figure 11:
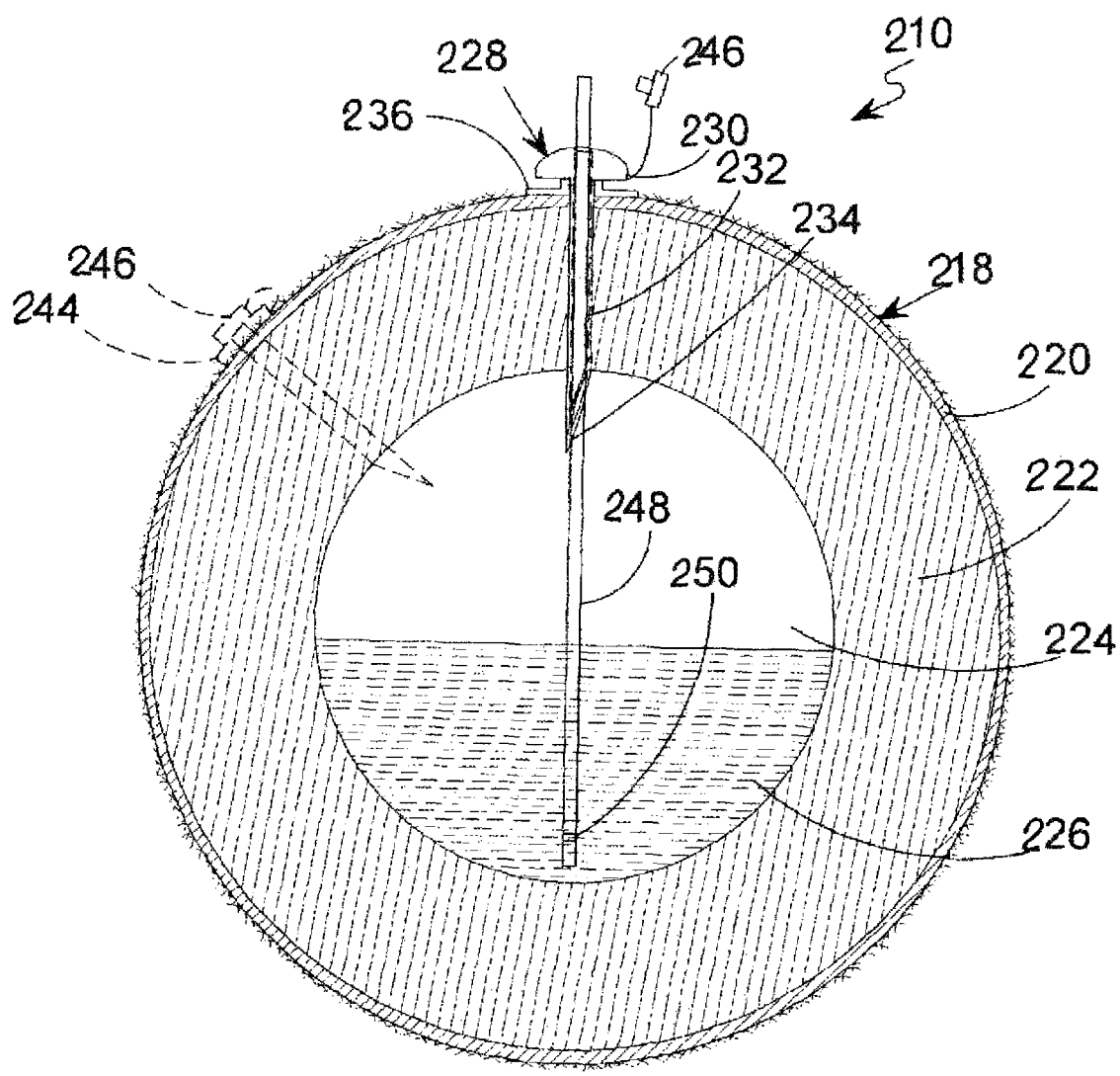
FIG. 11 is an elevational, sectional view of a coconut having a straw with slits and a closed end.

FIG. 11 is a sectional view of the coconut spigot inserted into the coconut water cavity. Illustrated is spigot 228 comprising spout 230 and conduit 232 terminating in spike-tip 234 fully inserted through coconut meat 222 into the coconut cavity 224 of coconut seed 218 having coconut seed-case 220 thereby providing access to coconut water 226 via straw 248 having filter 250. Grommet 236 serves as attachment for the spigot cap and as a stop for completing the insertion of spigot 228 into coconut cavity 224 with bung 246 serving as closure to keep any unconsumed coconut fresh.

Figure 12:
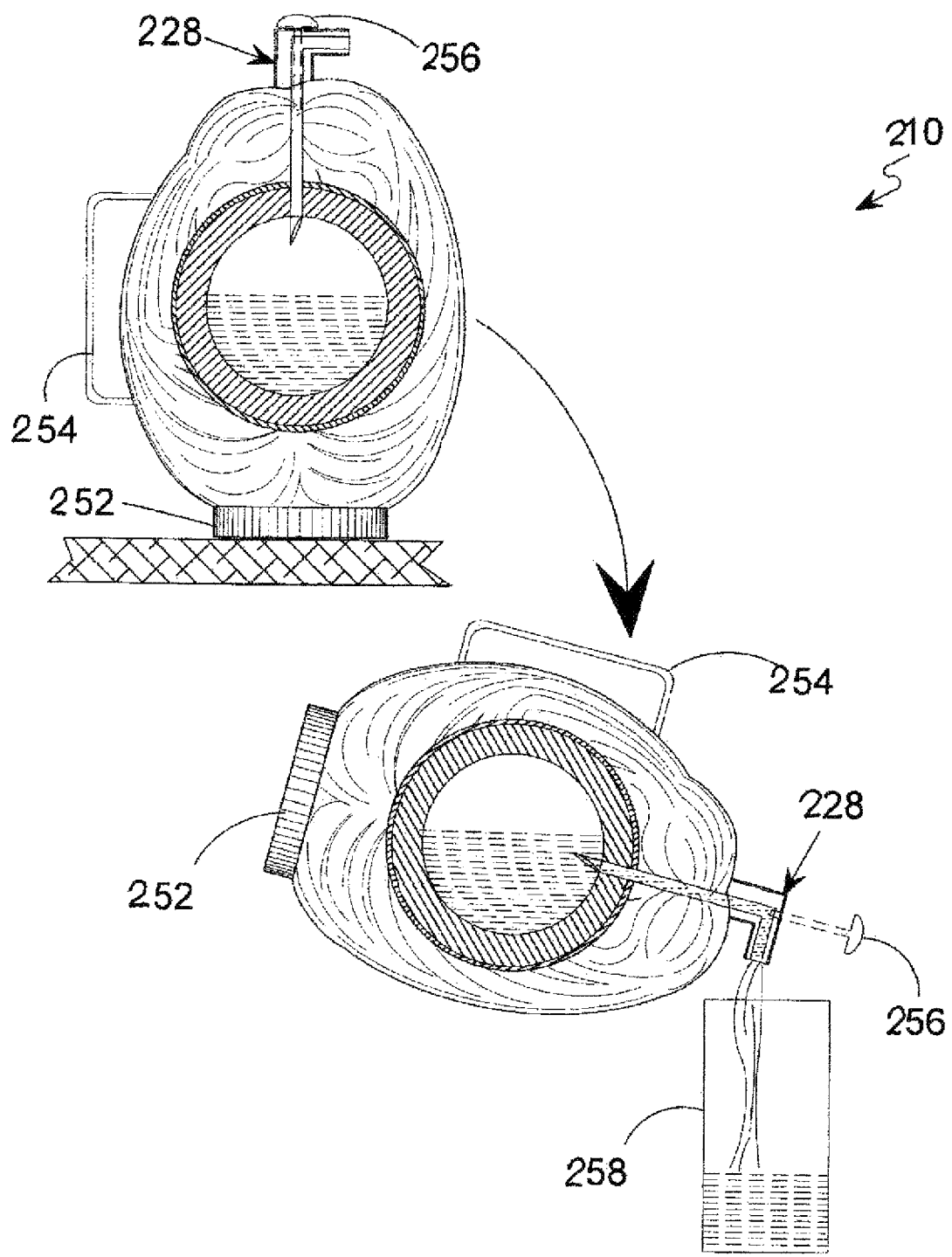
FIG. 12 is an exemplary view of a stand and handle for a coconut.

FIG. 12 is an illustrative view of additional elements of the present invention. More particularly, the present invention 210 provides for a coconut stand 252 and coconut handle 254 as a convenience for accessing the coconut water. Further provided is spigot 228 having a plunger 256 that seals spigot 228 to keep the coconut water fresh until the plunger is selectively removed from the spigot conduit where then the consumer can dispense the coconut water into glass 258.

Figure 13:
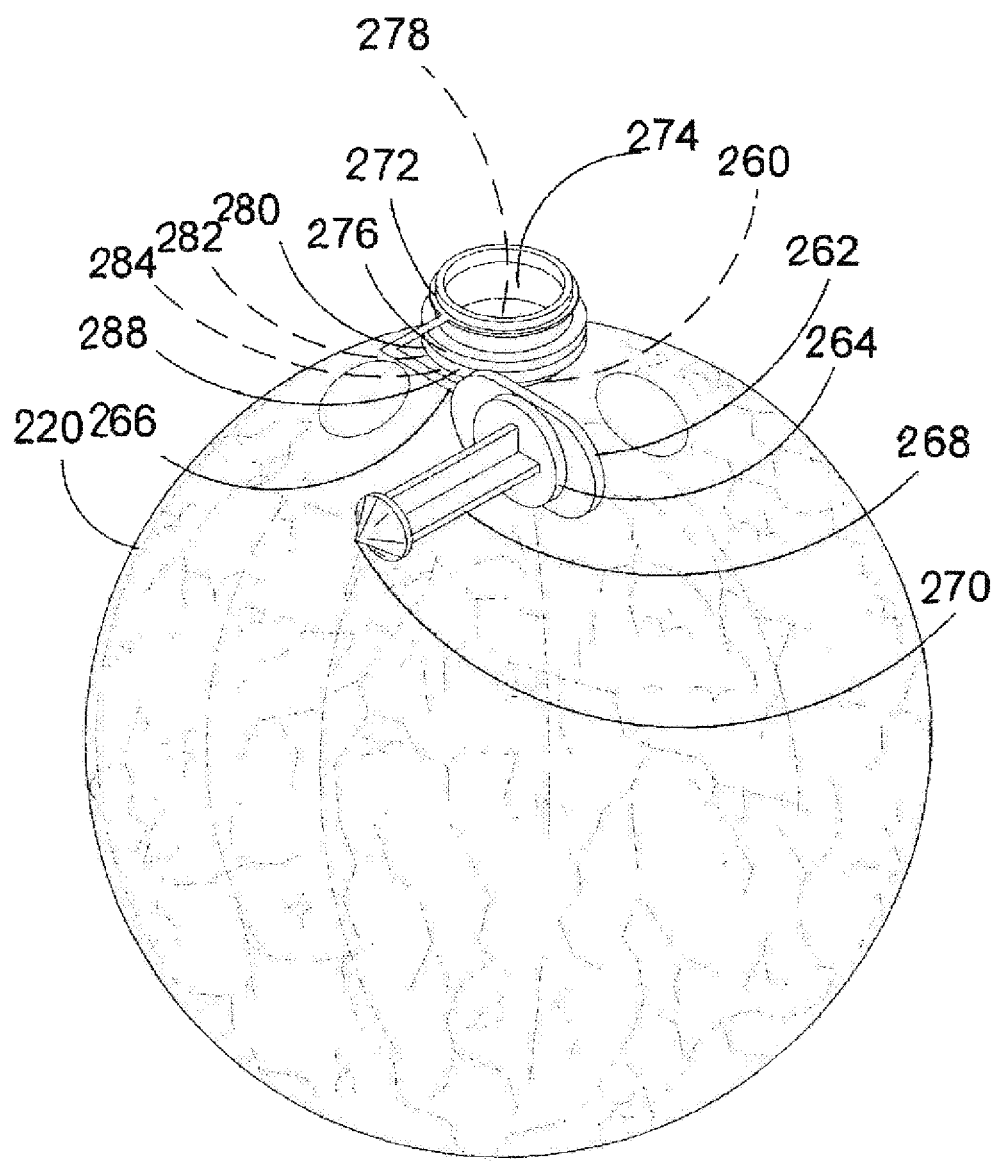
FIG. 13 is a prospective, exemplary of an alternate preferred embodiment of the present invention.

FIG. 13 is an illustrative view of an alternate preferred embodiment of the present invention. Shown is coconut 220 having aperture 260 placed within the wall having a predetermined diameter so that valve plug 280 seats within said aperture with valve plug collar 282 substantially engaging the wall of aperture 260. Valve plug 280 has valve plug bore 284 for receiving plunger sleeve 272 having plunger sleeve bore 274 with a based positioned plunger sleeve membrane 278 that seals the coconut's contents until plunger stopper 262 having plunger-stopper lance 268 and plunger-stopper lance tip 270 is used to puncture plunger sleeve membrane 278 thereby providing access to the coconut water contained within the coconut. Plunger-stopper 262 is tethered via 266 to plunger sleeve 272. The plunger-stopper 62 serves to provide access to the coconut's contents and also serves as stopper to seal any remaining coconut contents for future use by providing plunger-stopper 264 that seals plunger sleeve bore 274.

Figure 14:
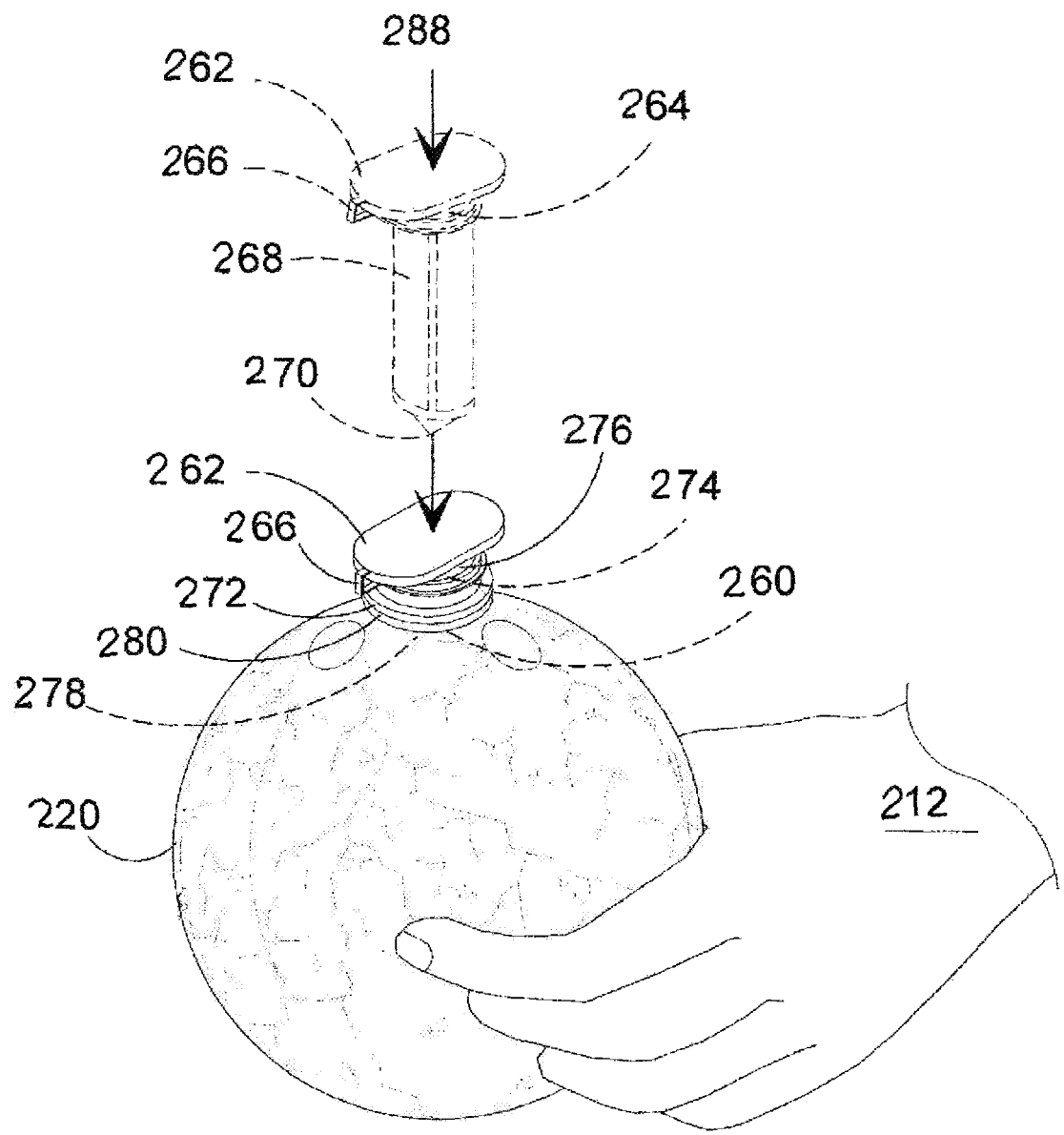
FIG. 14 is a prospective, exemplary view of the plunger-stopper providing access to the coconut water.

FIG. 14 is an illustrative view of the plunger-stopper providing access to the coconut water. Coconut 220 has a tooled aperture 260 placed through the seed wall having a predetermined diameter so that valve plug 280 can be pressed into said aperture so that the valve plug collar 282 engages the top periphery wall of said coconut aperture 260 while the valve plug flange engages the interior periphery wall of said coconut aperture 260. Plunger sleeve 272 is seated within valve plug bore 284, shown in FIG. 30, having a base positioned plunger sleeve membrane 278 that seals the coconut's contents.

Figure 15:
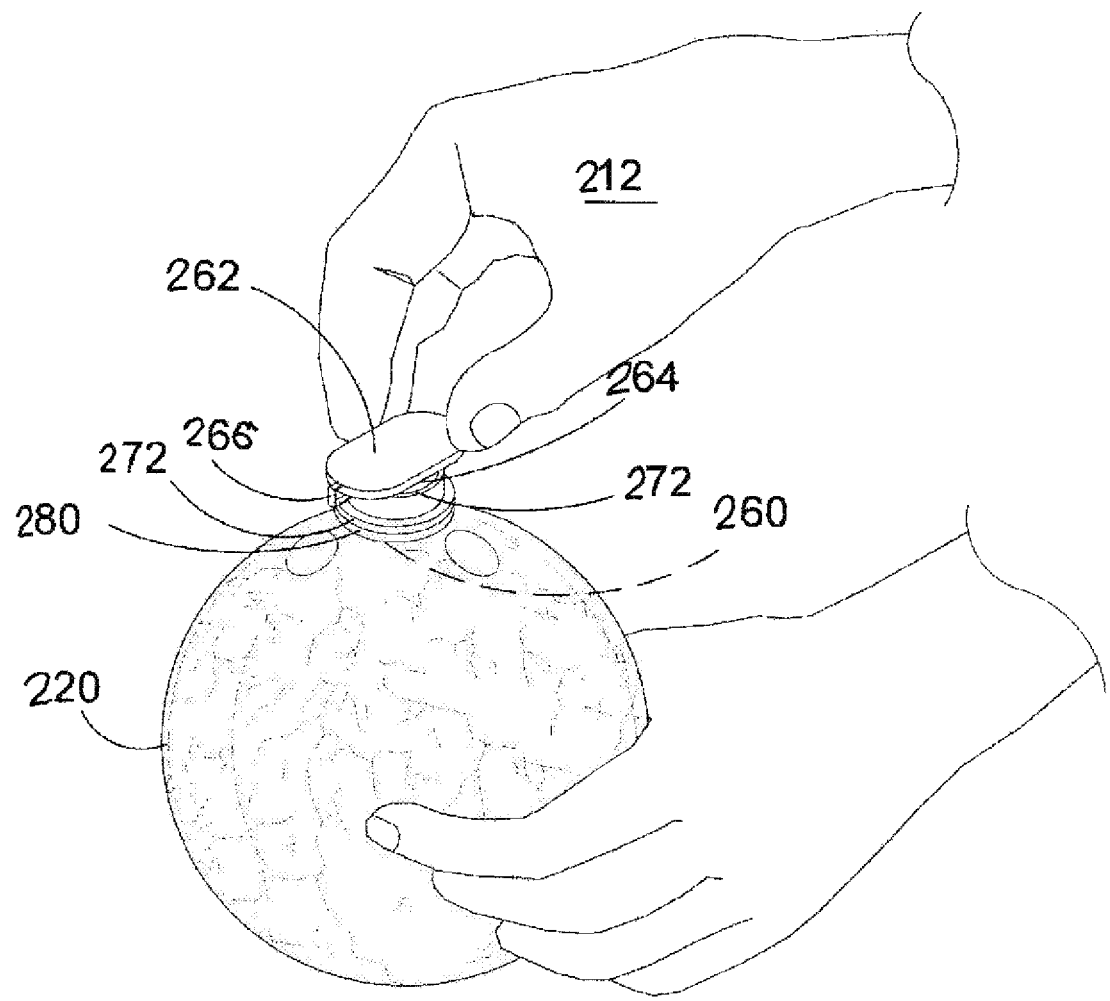
FIG. 15 is a prospective, exemplary view of the coconut resealed for future consumption.

FIG. 15 is an illustrative view of the coconut resealed for future consumption. Using the tethered plunger stopper 262, the user 212 can selectively pierce the plunger sleeve membrane 278 allowing access to a desired portion of the coconut water and then reseal the coconut by inserting plunger stopper 262 into the plunger sleeve bore 274 thereby preserving the coconut water for later consumption.

Figure 16:
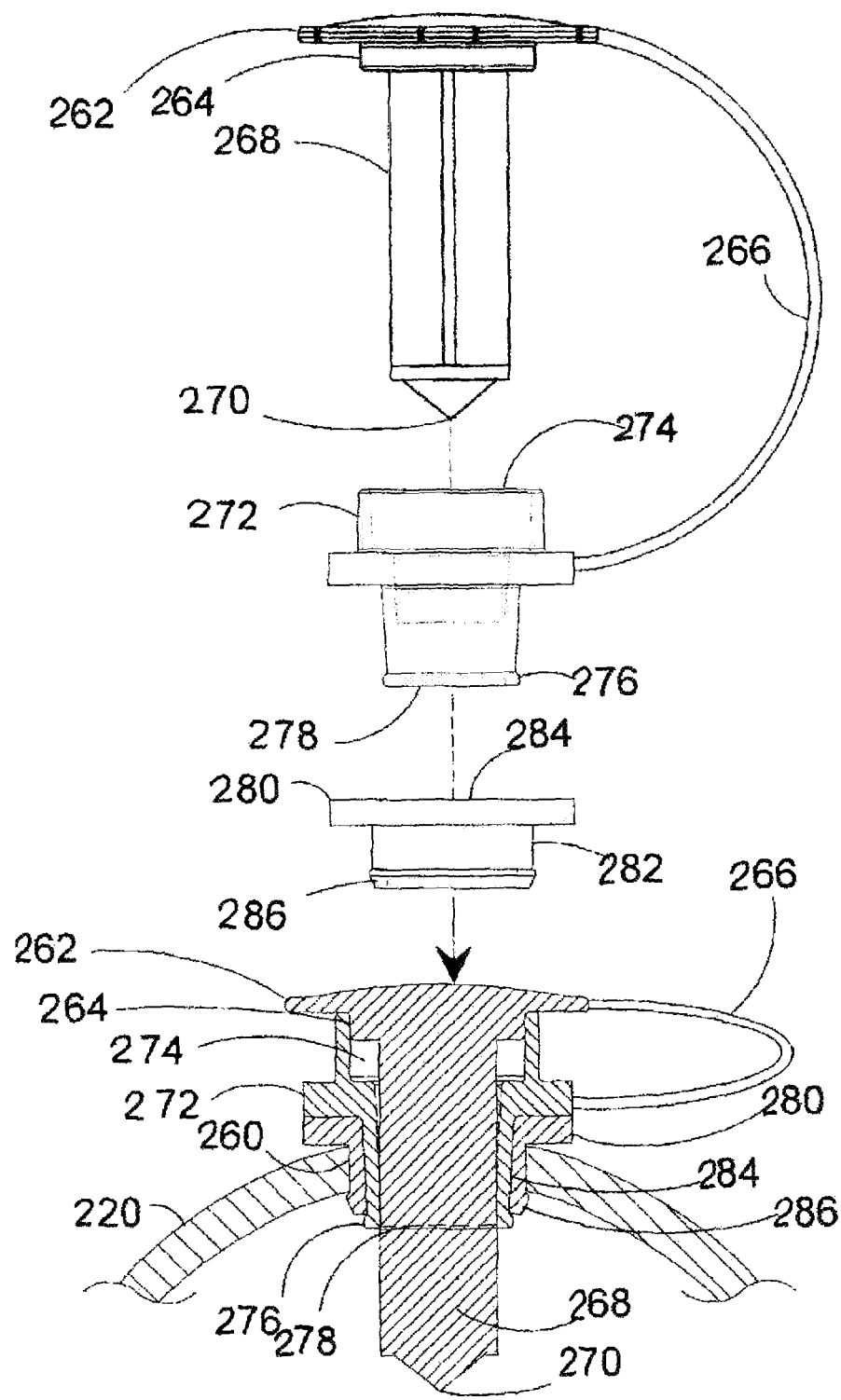
FIG. 16 is an exploded, elevational view of an alternate preferred embodiment of the present invention.
Figure 17:
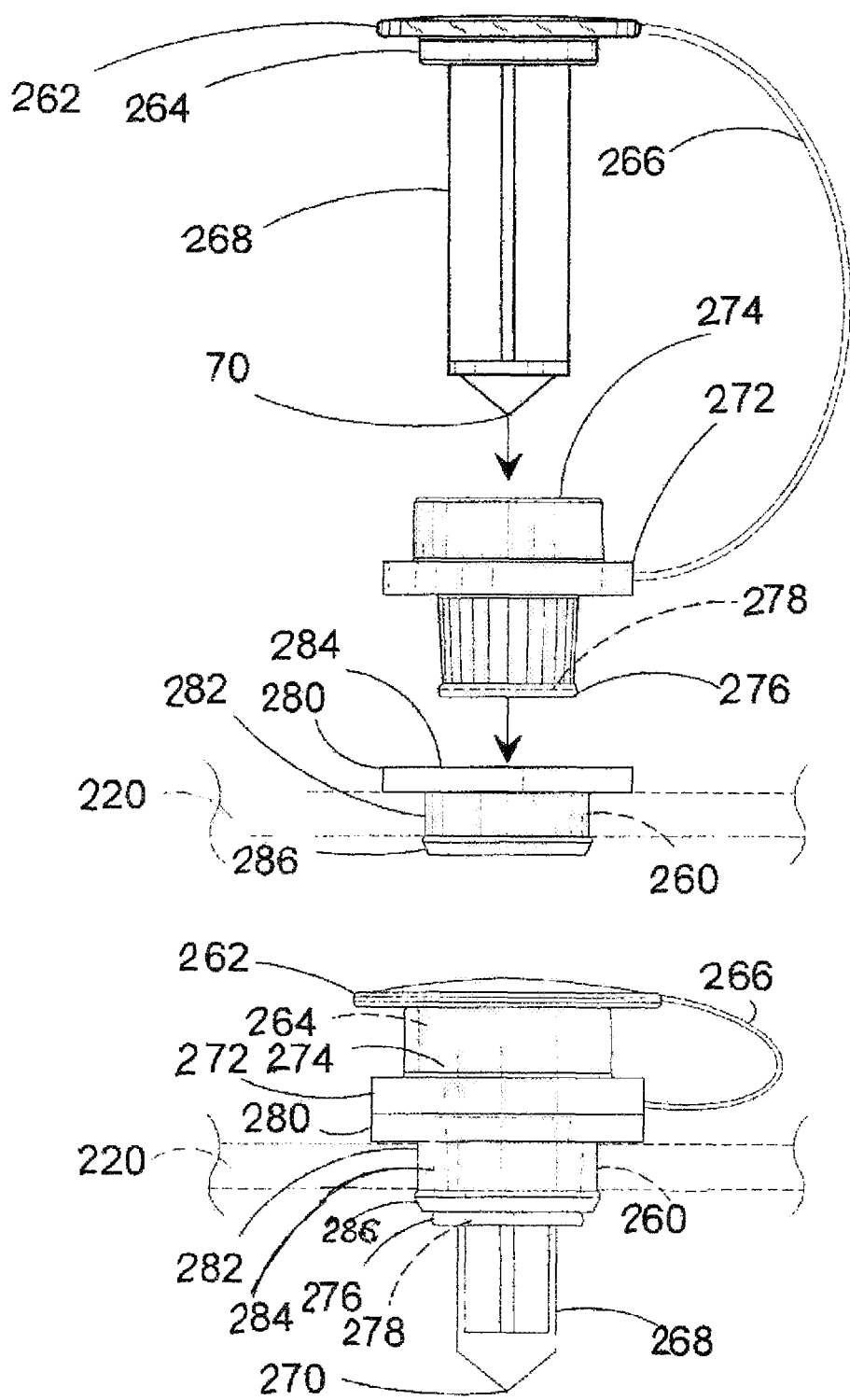
FIG. 17 is an exploded, elevational view of an alternate preferred embodiment of the present invention.

FIGS. 16 and 17 are illustrative views of an alternate preferred embodiment of the present invention. Shown is coconut 220 having aperture 260 placed within the wall having a predetermined diameter so that valve plug 280 seats within said aperture with valve plug collar 282 substantially engaging the wall of aperture 260. Valve plug 280 has valve plug bore 284 for receiving plunger sleeve 272 having plunger sleeve bore 274 with a based positioned plunger sleeve membrane 278 that seals the coconut's contents until plunger stopper 262 having plunger-stopper lance 268 and plunger-stopper lance tip 270 is used to puncture plunger sleeve membrane 278 thereby providing access to the coconut water contained within the coconut. Plunger-stopper 262 is tethered via 266 to plunger sleeve 272. The plunger-stopper 262 serves to provide access to the coconut's contents and also serves as stopper to seal any remaining coconut contents for future use by providing plunger-stopper 264 that seals plunger sleeve bore 274.

Figure 18:
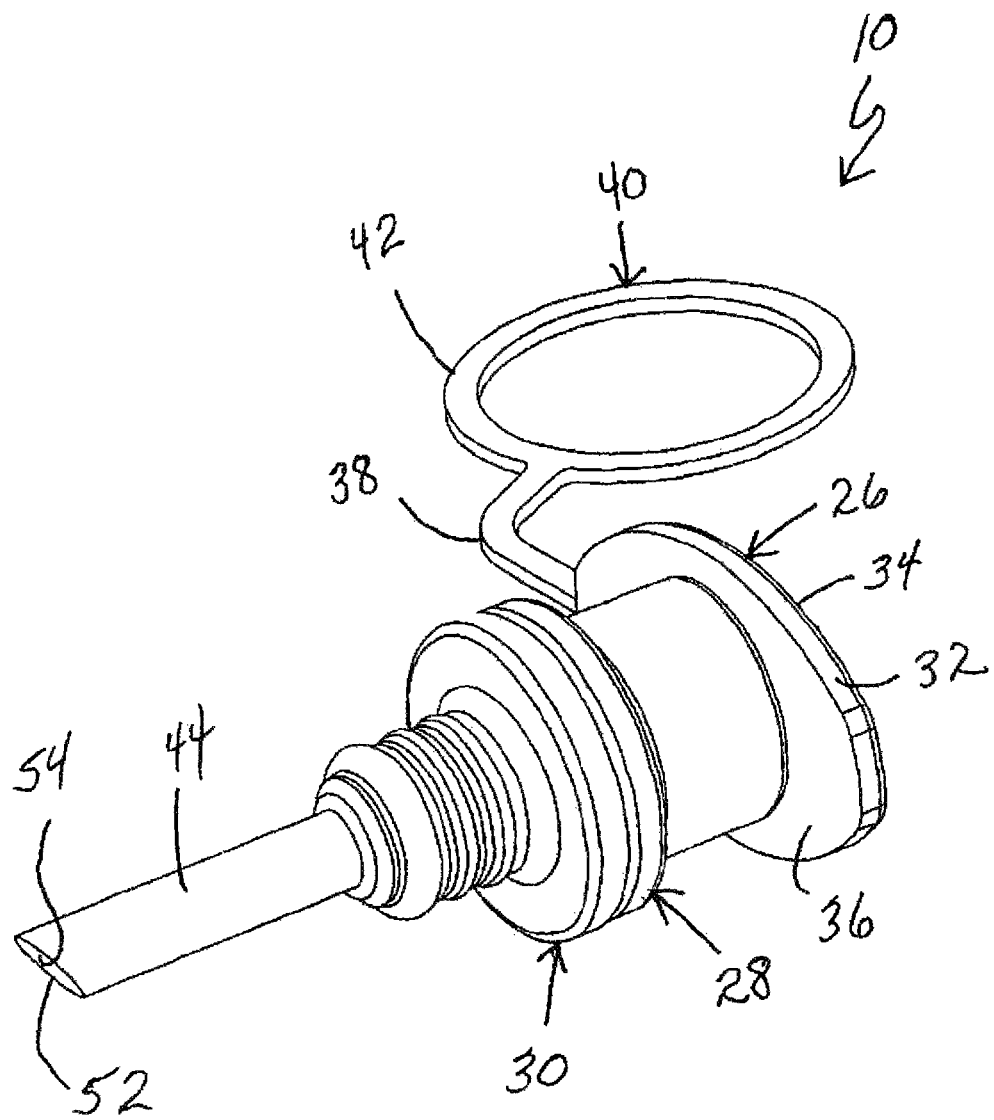
FIG. 18 is a perspective assembly view of another alternative preferred embodiment of the spigot of the present invention.
Figure 19A:
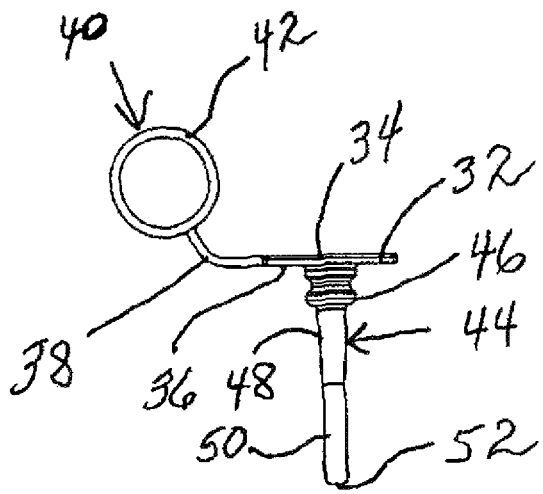
FIG. 19A through 19E is an illustrative view of an embodiment of the plunger.
Figure 19B:
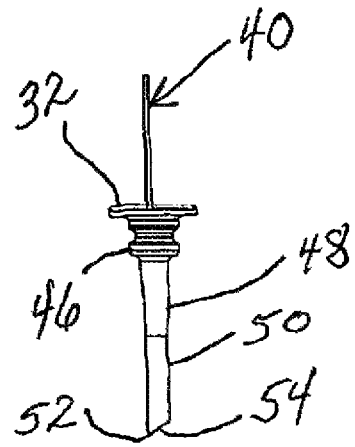
Figure 19C:
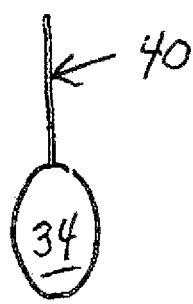
Figure 19D:
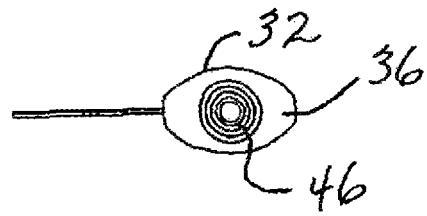
Figure 19E:
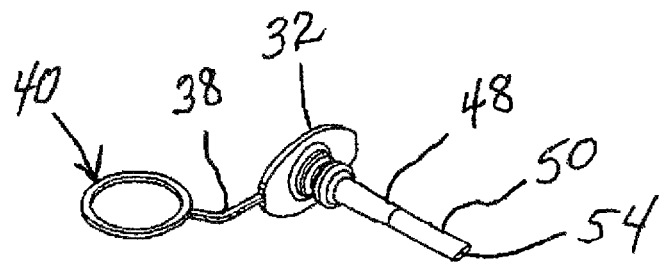
Figure 20A:
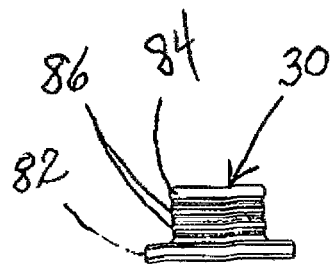
FIG. 20A through 20D is an illustrative view of an embodiment of the spigot grommet.
Figure 20B:
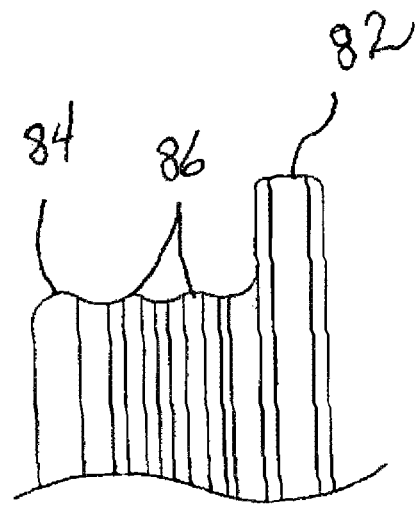
Figure 20C:
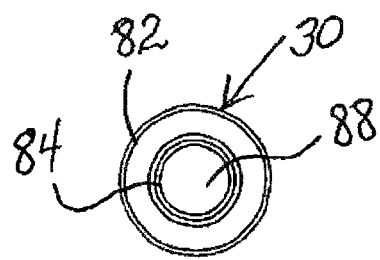
Figure 20D:
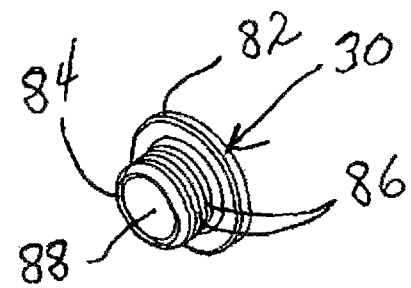
Figure 22A:
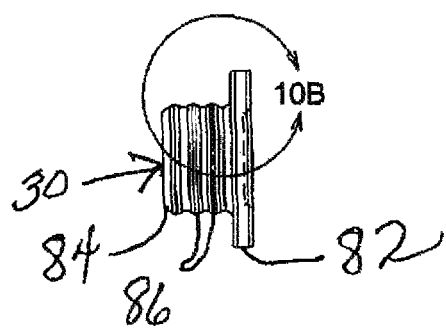
Figure 22B:
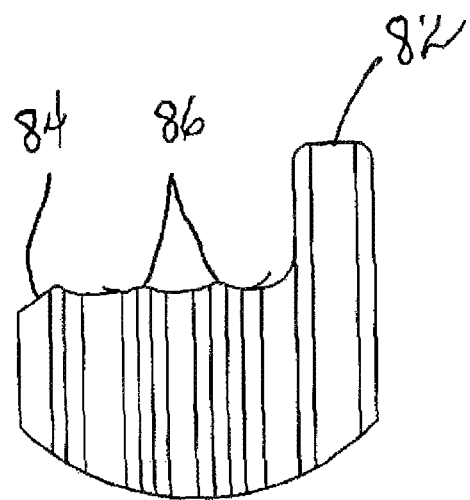
Figure 22C:
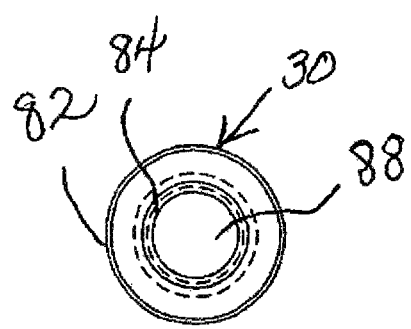
Figure 22D:
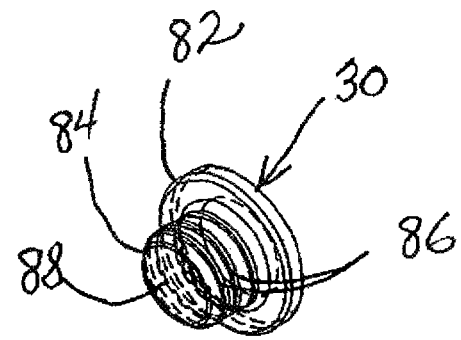
Figure 23A:
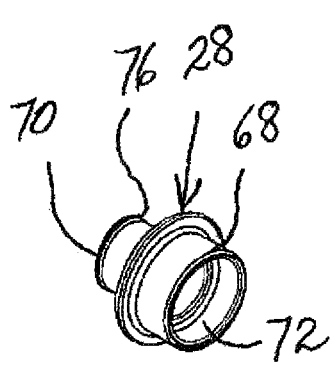
Figure 23B:
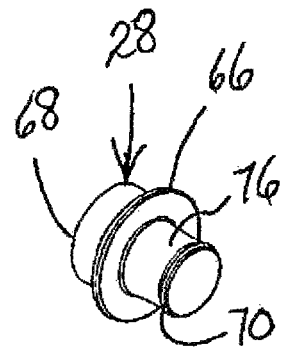
Figure 23C:
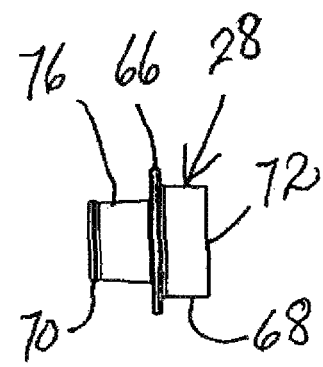
Figure 23D:
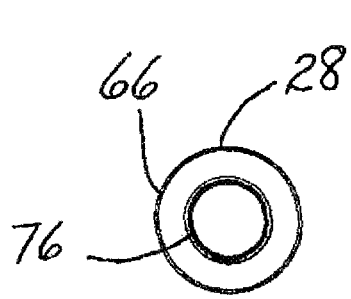
Figure 23E:
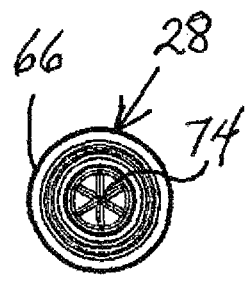
Figure 23F:
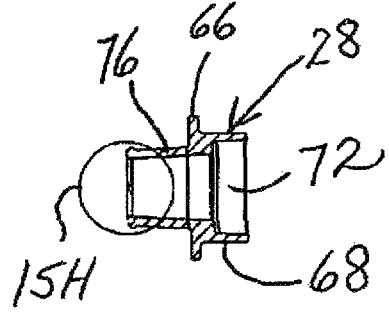
Figure 23G:
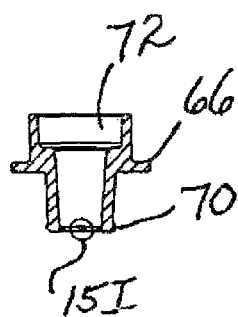
Figure 23H:
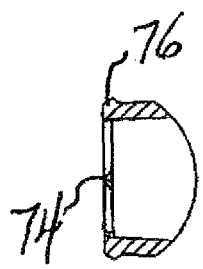
Figure 23I:
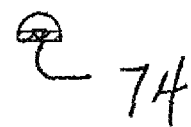
Figure 24A:
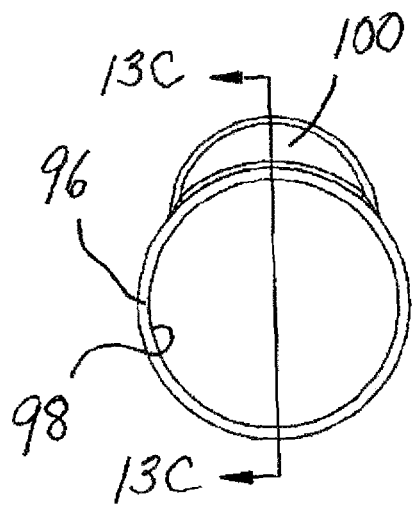
Figure 24B:
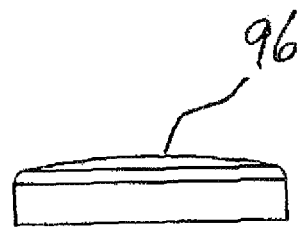
Figure 24C:
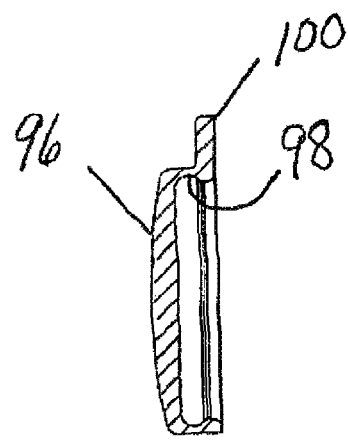
Figure 24D:
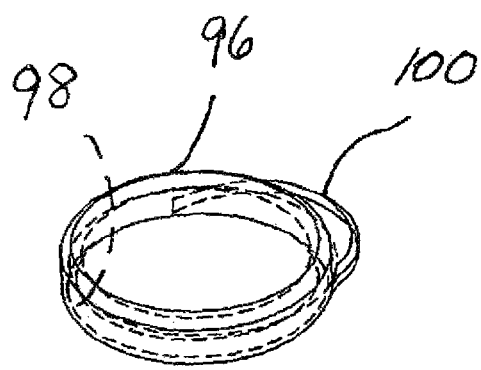
Figure 25A:
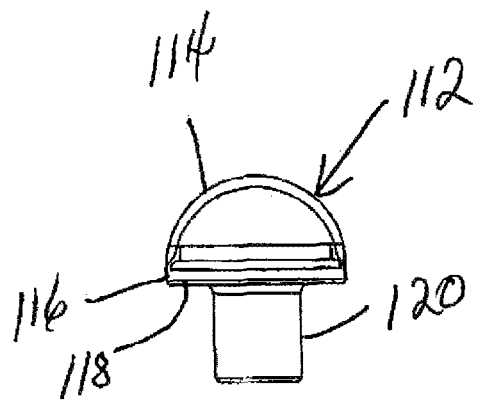
Figure 25B:
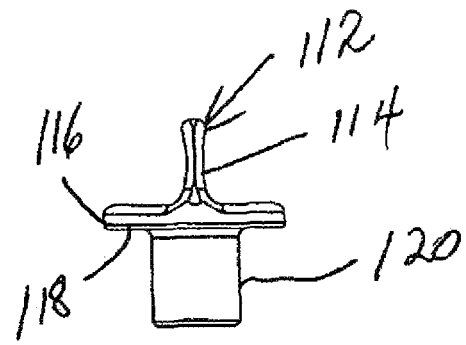
Figure 25C:
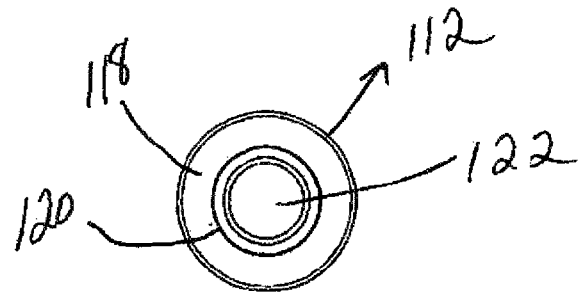
Figure 25D:
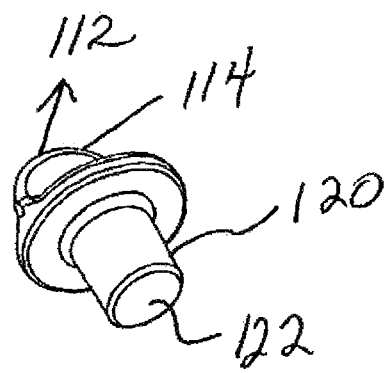
Figure 26A:
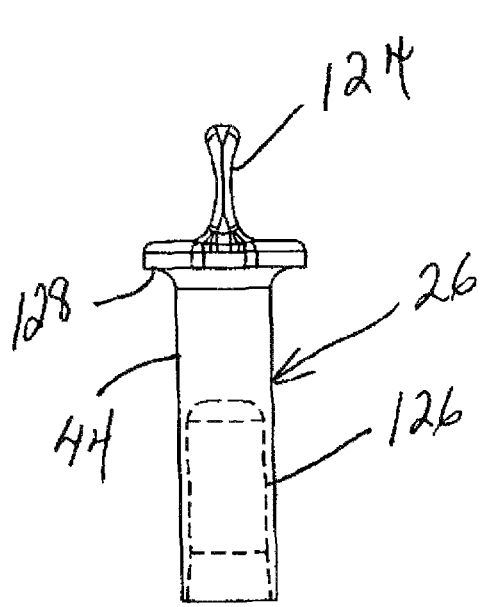
Figure 26B:
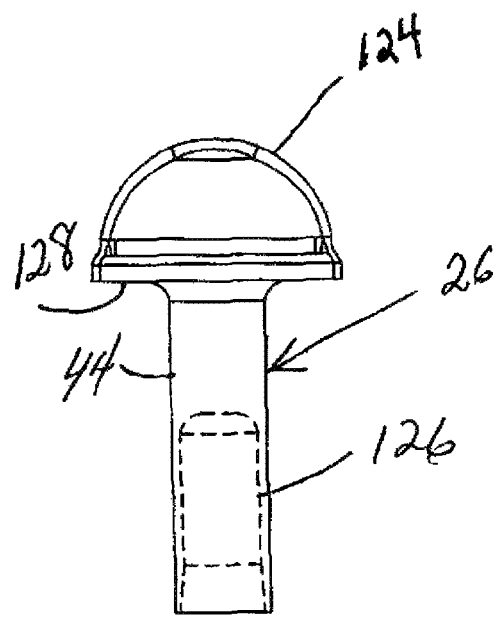
Figure 26C:
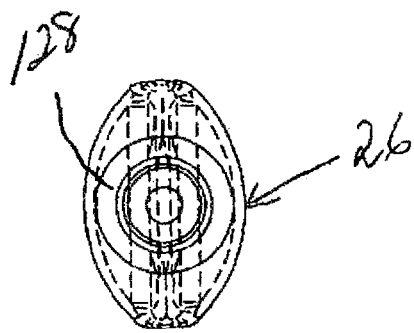
Figure 26D:
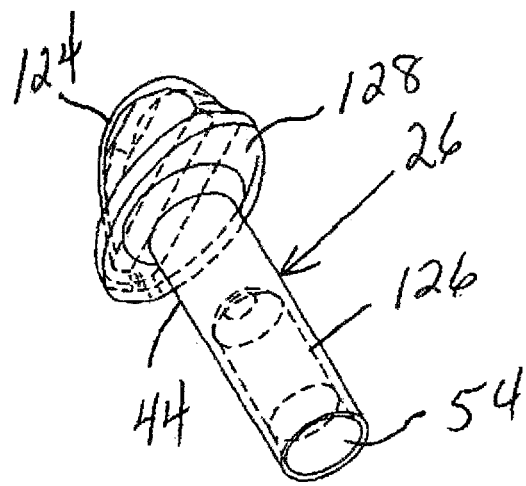

Referring to FIG. 18, shown is a perspective assembly view of an alternative embodiment of the spigot of the present invention. The present invention 10 provides a plunger sleeve 28 that is partially inserted into the coconut shell and not the meat and then shipped to consumers who then complete inserting the plunger 26 through the coconut meat into the coconut seed-case cavity providing access to the sterile coconut water. As illustrated, the spigot 10 comprises plunger 26, sleeve 28 and grommet 30. Plunger 26 has arm 38 and ringlet 42 forming plunger grip 40. The plunger further provides flange 32 having top surface 34 and bottom surface 36 having conduit 44 with bore 54 extending therefrom terminating in end 52. Sleeve 28 mounts onto conduit 44 with grommet 30 mounting onto sleeve 28.

Referring to FIG. 19A through 19E shown is an illustrative view of an embodiment of the plunger. Plunger 26 has arm 38 and ringlet 42 forming plunger grip 40. The plunger further provides flange 32 having top surface 34 and bottom surface 36 with conduit 44 having bore 54 extending from the flange bottom surface 36. Conduit 44 provides for a conduit having a conical portion 48 and a cylindrical portion 50 with the flange end of the conduit having a sleeve seat gasket 46 mateable to the sleeve seat.

Referring to FIG. 20A through 20D shown is an illustrative view of an embodiment of the spigot grommet. Grommet 30 holds spigot 10 within a cavity drilled in the coconut wall with flange 82 seated against the rim of the cavity. Grommet collar 84 has ridges 86 serving as grommet gasket. Grommet bore 88 enable mounting of the spigot sleeve within bore 88.

Referring to FIG. 21A through 21D shown is an illustrative view of another embodiment of the spigot grommet. Grommet 30 holds spigot 10 within a cavity drilled in the coconut wall with flange 82 seated against the rim of the cavity. Grommet collar 84 has ridges 86 serving as grommet gasket. Grommet bore 88 enable mounting of the spigot sleeve within bore 88.

Referring to FIG. 22A through 22D shown is an illustrative view of another embodiment of the spigot grommet. Grommet 30 holds spigot 10 within a cavity drilled in the coconut wall with flange 82 seated against the rim of the cavity. Grommet collar 84 has ridges 86 serving as grommet gasket. Grommet bore 88 enable mounting of the spigot sleeve within bore 88.

Referring to FIG. 23A through 23I, shown is another illustrative view of an embodiment of the spigot sleeve. Sleeve 28 has bore 80 with flange 66 having opposing side collars extending therefrom. Collar 68 forms sleeve seat 72 receiving sleeve seat gasket 46 and collar 76 forms grommet seat collar 76 having lip 78 as stop for grommet 30 mounted thereon. Also shown is sleeve 28 having sleeve membrane 74 which can be punctured by the plunger 26 to retrieve the coconut water from the seed-case cavity. Here the coconut remains sealed during shipping and handling by both the layer of coconut meat 20 and the membrane 74, until the consumer punctures the membrane 74 before inserting the plunger 26 through the layer of coconut meat 20 to retrieve the coconut water, similarly to the embodiments of FIGS. 14-17.

Referring to FIGS. 24A through 24D, shown is the plunger cap of the spigot of the present invention. An embodiment of the plunger cap of the present invention provides for plunger conduit 44 to terminate at its upper end in flange collar having a rim (See, e.g., FIG. 32 and portion 128), with cap 96 having tab 100 and a cap channel 98 receiving the collar rim therein, to thereby cap-off the plunger conduit 44.

Referring to FIG. 25A through 25D, shown is an illustrative view of a coconut aperture plug. Plug 112 sits within grommet 30 to prevent contamination of the coconut aperture. Plug 112 having handle 114 used to manipulate plug 112 has flange 116 with bottom surface 118 that engages grommet flange 82 while collar 120 engages grommet bore 88 thereby sealing the coconut aperture. It is apparent that plug 112 can be inserted into grommet 30 to prevent contamination of the coconut aperture during shipping and handling, with plunger 26 being packaged with the coconut for insertion by the consumer (as in the embodiment of FIG. 10), or the plunger 26 can be inserted into grommet 30 during shipping and handling, with plug 112 being packaged for insertion after the consumer removes plunger 26, as explained below in conjunction with FIGS. 27 and 28.

Referring to FIG. 26A through 26D shown is an illustrative view of additional embodiment of the plunger. Plunger 26 incorporates an additional element comprising handle 124 forming a plunger grip. The plunger further provides coring cavity 126 within conduit sleeve 44. Also provided is plunger stop 128 and conduit 44 that respectively engage grommet 30 and grommet bore 88 when seated therein.

Referring to FIGS. 27 and 28, shown are exploded views of an embodiment of the coconut spigot of the present invention. Depicted is the coconut spigot 10 comprising plunger 26, plug 112 and grommet 30. Grommet 30 has flange 82 and collar 84 with ridges 86 forming a gasket that will frictionally engage the wall of a coconut's milled cavity, where the plunger 26 having conduit 44 with coring cavity 126 is inserted into grommet 30 so that the coring cavity 126 is seated within the coconut meat until removed by the consumer, which will provide access to the coconut water. Also provided is plug 112 that is inserted into the coconut bore as a stopper to preserve the coconut's contents for later consumption.

Referring to FIG. 29, shown is an illustrative view of an embodiment of the spigot grommet. Grommet 30 comprises flange 82 having collar 84 extending therefrom with circumferential ridges 86 serving as frictional elements for engaging the wall of the milled coconut aperture when placed therein.

Referring to FIG. 30, shown is an illustrative view of a coconut aperture plug. Plug 112 having handle 114 used to manipulate plug 112 has flange 116 with bottom surface 118 that engages grommet flange 82 while collar 120 engages grommet bore 88 thereby sealing the coconut aperture with plug 112 sitting within grommet 30 prevents contamination of the coconut aperture.

Referring to FIG. 31, shown is an illustrative view of another enablement of the coconut aperture plug. Plug 112 having handle 114 used to manipulate plug 112 has flange 116 with bottom surface 118 that engages grommet flange 82 while collar 120 further incorporates circumferential ridges that will frictionally engage grommet bore 88 thereby sealing the coconut aperture from contamination of the coconut aperture.

Referring to FIG. 32 shown is an illustrative view of a plunger seated within a grommet. Plunger 26 incorporates handle 124 forming a plunger grip. The plunger further provides coring cavity 126 within conduit sleeve 44. Also provided is plunger stop 128 and conduit 44 that respectively engage grommet 30 and grommet bore 88 when seated therein.

Referring to FIG. 33, shown is an illustrative view of a coconut. Depicted is a coconut 12 having coconut eyes 104. The coconut comprises husk 14 and coconut seed 16 encasing coconut meat 20 encompassing coconut seed-case cavity 22 having coconut water 24 within.

Referring to FIG. 34, shown is a coconut with a milled bore and grommet. Depicted is coconut 12 having coconut eyes 104 with milled aperture 134 and aperture wall 136 with grommet 30 ready to be inserted into said coconut aperture.

Referring to FIG. 35, shown is a coconut with a seated grommet. Depicted is coconut 12 having coconut eyes 104 with milled aperture 134 and aperture wall 136 with grommet 30 positioned within said coconut cavity with plunger 26 having handle 124 and conduit 44 is ready to be seated within said grommet.

Referring to FIG. 36, shown is a coconut with a seated grommet and plunger. Depicted is coconut 12 having coconut eyes 104 with milled aperture 134 and aperture wall 136 with grommet 30 positioned within said coconut cavity with plunger 26 having handle 124 and conduit 44 seated within said grommet 30.

Referring to FIGS. 37 through 41, shown is a progression of illustrations of the method for accessing coconut water. Shown is a coconut 12 having coconut eyes 14 where then a milled aperture 134 of predetermined diameter and depth is created without milling through the coconut's endosperm. Once milled grommet 30 having collar 84 with circumferential ridges 86 is then inserted aperture 134, where grommet ridges 86 frictional engage aperture wall 136 thereby sealing aperture 134 from contamination. Plunger 26 having handle 124 is then inserted into grommet bore 88 with plunger 26 having conduit 44 with bore 54 that will cut through the coconut endosperm (white meat) making a clean hole through the white meat. When desired the plunger 26 is removed from the coconut grommet bore 88, which removes the cored white meat providing access to the coconut water. Further provided is a plug 112 having conduit 44 and handle 124 that is inserted into grommet bore 88 to reseal the spigot until desired.

While only several embodiments of the present invention have been shown and described, it will be obvious to those skilled in the art that many modifications may be made to the present invention without departing from the spirit and scope thereof.

What is claimed is:

1. A method for providing a self-contained, consumer-ready product from a coconut that has a seed-case, a layer of coconut meat inside of the seed-case, and an internal cavity containing sterile coconut water, in a condition that is ready for a consumer to access and remove the sterile water within the coconut, the method comprising:
   (a) forming an aperture that extends through the seed-case of the coconut but does not extend through the layer of coconut meat, thereby maintaining the sterility of the coconut water;
   (b) forming a coconut pre-product in a first location, by affixing to the apertured coconut a closure member that is adapted to close the aperture and to be easily removed by a consumer, in a second location different from the first location, without using any tool, the closure member likewise not extending through the layer of coconut meat, thereby maintaining the sterility of the coconut water; and
   (c) providing a self-contained, consumer-ready coconut product, by associating, with the coconut pre-product of paragraph (b) a pre-selected plunger member that includes an elongated lance member that is (1) configured to slide within the aperture after the consumer has removed the closure member in the second location and (2) has a length that is sufficient to penetrate through the layer of coconut meat and into the internal cavity containing the sterile water, when inserted through the aperture and pushed in the direction of the coconut center by the consumer.

2. A method as recited in claim 1, wherein the closure member comprises a removable plug member that closes the aperture.

3. A method as recited in claim 2, wherein the plug member cooperates with a grommet member that surrounds the aperture.

4. A method as recited in claim 2, wherein the closure member comprises a single piece.

5. A method as recited in claim 2, wherein the closure member comprises a plurality of pieces.

6. A method as recited in claim 2, wherein the closure member comprises a cap fitting on the grommet member.

7. A method as recited in claim 1, wherein the closure member comprises a plug member that contains a frangible membrane that is removable by perforation with the plunger member.

8. A method as recited in claim 2, wherein the distal end of the elongated lance member of the plunger member comprises a sharp edge, and the plunger member comprises a hollow center recess for receiving severed coconut meat.

9. A method as recited in claim 3, wherein the grommet member comprises a generally flat flange member that sits essentially flush with the coconut shell when the grommet member is affixed to the coconut.

10. A method as recited in claim 1, further comprising:
    (d) placing the consumer-ready product of paragraph (c) into commerce to be distributed to consumers.

11. A self-contained, consumer-ready coconut product from a coconut that has a seed-case, a layer of coconut meat inside of the seed-case, and an internal cavity containing sterile coconut water, in a condition that is ready for a consumer to access and remove the sterile water within the coconut, the coconut product produced by the method as defined by claim 1.

* * * * *